United States Patent [19]

Nomura et al.

[11] Patent Number: 6,118,762
[45] Date of Patent: *Sep. 12, 2000

[54] BURST TRANSFER SYSTEM

[75] Inventors: Yuji Nomura; Shunji Abe, both of Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/702,887

[22] Filed: Aug. 26, 1996

[30] Foreign Application Priority Data

Aug. 23, 1995 [JP] Japan ................... 7-214729
May 1, 1996 [JP] Japan ................... 8-110658

[51] Int. Cl.$^7$ .................................................. H04L 12/56
[52] U.S. Cl. ........................... 370/230; 370/395; 370/351
[58] Field of Search .................................. 370/233, 235, 370/236, 395, 397, 438, 439, 443, 458, 461, 463, 465, 468, 477, 230, 231, 238, 398, 400, 410, 351

[56] References Cited

U.S. PATENT DOCUMENTS

| | | | |
|---|---|---|---|
| 5,065,392 | 11/1991 | Sibbitt et al. . | |
| 5,179,556 | 1/1993 | Turner | 370/233 |
| 5,448,559 | 9/1995 | Hayter et al. | 370/398 |
| 5,539,743 | 7/1996 | Amemiya et al. | 370/461 |
| 5,559,797 | 9/1996 | Murase | 370/428 |
| 5,566,175 | 10/1996 | Davis | 370/468 |
| 5,636,212 | 6/1997 | Ikeda | 370/233 |

FOREIGN PATENT DOCUMENTS

| | | |
|---|---|---|
| 0406759 | 1/1991 | European Pat. Off. . |
| 0 413 488 A2 | 2/1991 | European Pat. Off. . |
| 0596624 | 5/1994 | European Pat. Off. . |
| 630021 | 2/1994 | Japan . |

OTHER PUBLICATIONS

Burgin et al., "Broadband ISDN Resource Management: The Role of Virtual Paths", IEEE Communications, vol. 29, No. 9, Sep. 1991, pp. 44–48.

IEEE Journal on Selected Areas in Communications, vol. 11, No. 8, Oct. 1, 1993, pp. 1145–1159, XP000491811, Gerla M et al: "Internetting Lan's and Man's to B–ISDN's for Connectionless Traffic Support", p. 1148, col. 2, line 12–19 p. 1149, col. 1, line 35–43.

*Primary Examiner*—Chau Nguyen
*Assistant Examiner*—Soon-Dong Hyun
*Attorney, Agent, or Firm*—Helfgott & Karas, P.C.

[57] ABSTRACT

A burst transfer system realizes burst transfer between communication terminals in a communication network of the label multiplex system or the time-division multiplex type. In the burst transfer system, the communication terminal is so designed as to output a communication reservation request which is made up of destination information including the address of the transmitting side communication terminal and the address of the receiving side communication terminal, and band information representing the start time, the use band of the burst transfer, etc. The burst transfer system includes request receiving means for receiving the communication reservation request; communication request analyzing means for extracting destination information and the band information from the communication reservation request received by the request receiving means; path setting means for discriminating paths through which the transmitting side communication terminal and the receiving side destination are connectable to each other on the basis of the destination information; and band reserving means, if a path that satisfies a condition indicated by the band information exists in the paths which are discriminated by the path setting means, for reserving the path.

6 Claims, 29 Drawing Sheets

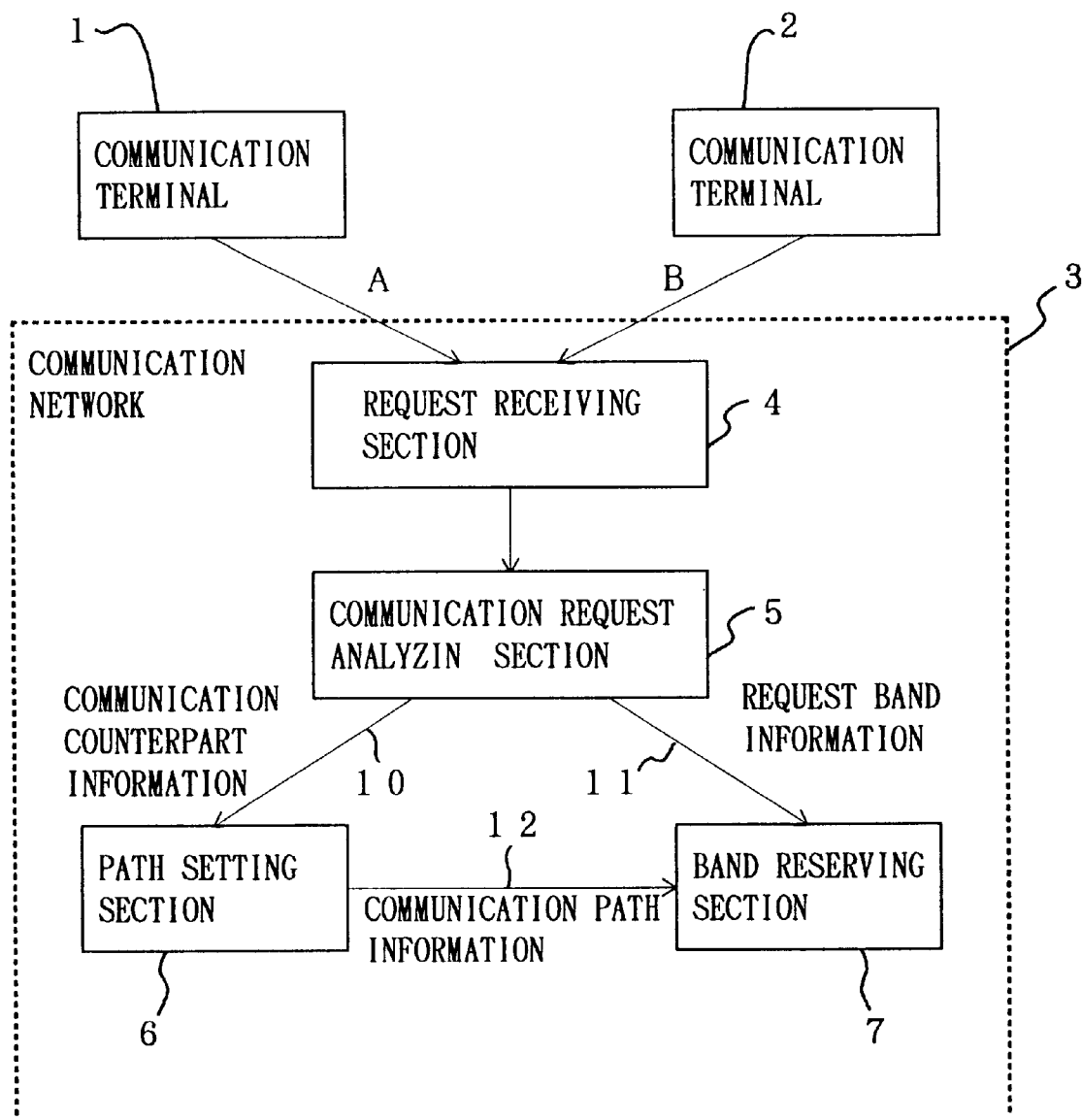
F I G. 1

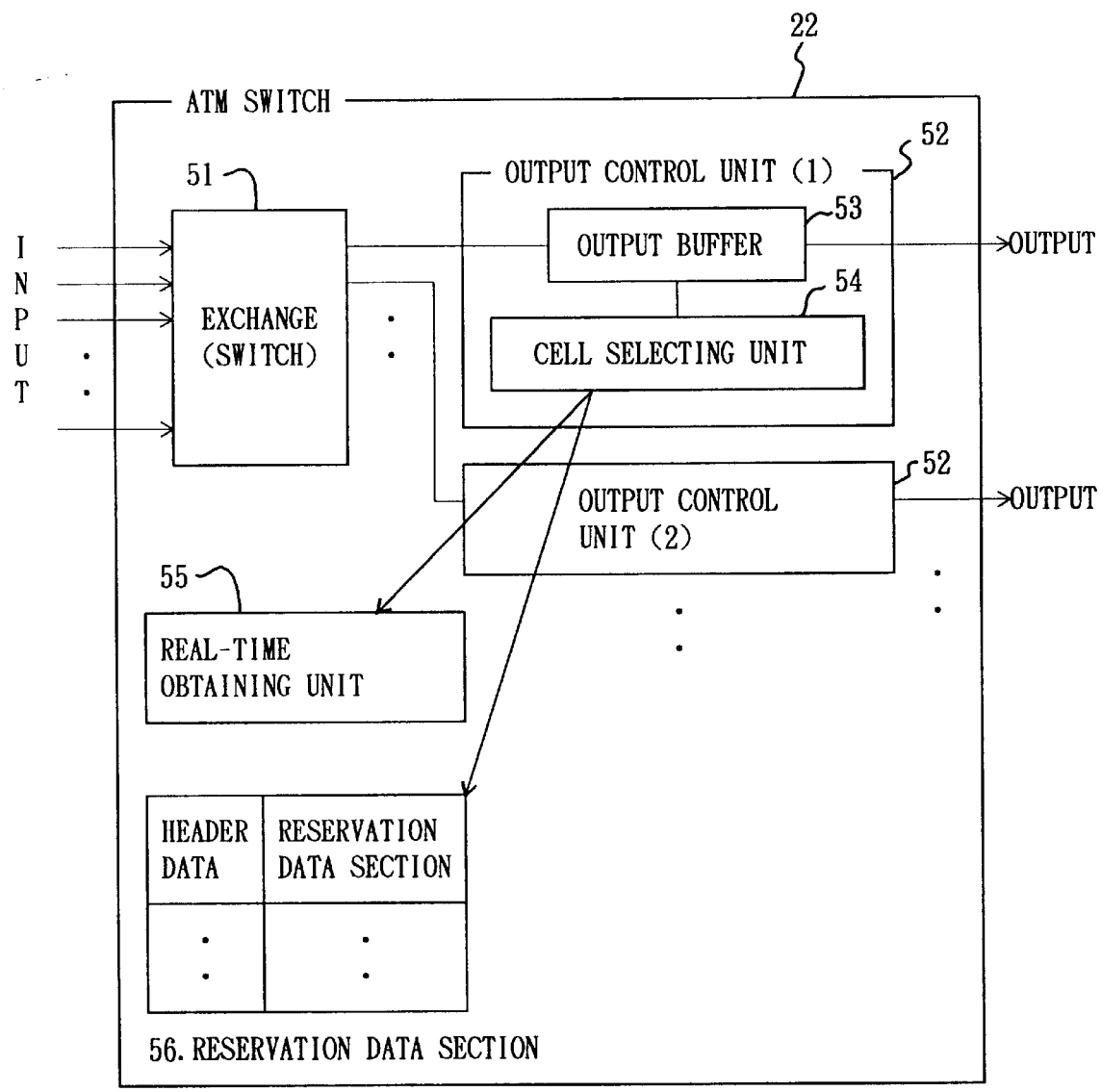
F I G. 3

| ID | DST | ORG | SIZE | TIME | PERIOD | PSIZE |
|----|-----|-----|------|------|--------|-------|

ESSENTIAL ITEM

ID : INHERENT NUMBER
DST : TRANSMITTING SIDE ADDRESS
ORG : RECEIVING SIDE ADDRESS
SIZE : COMMUNICATION AMOUNT

OPTIONAL ITEM

TIME : DESIRED COMMUNICATION START TIME
PERIOD : GENERATION INTERVAL
PSIZE : GENERATION UNIT

FIG. 7

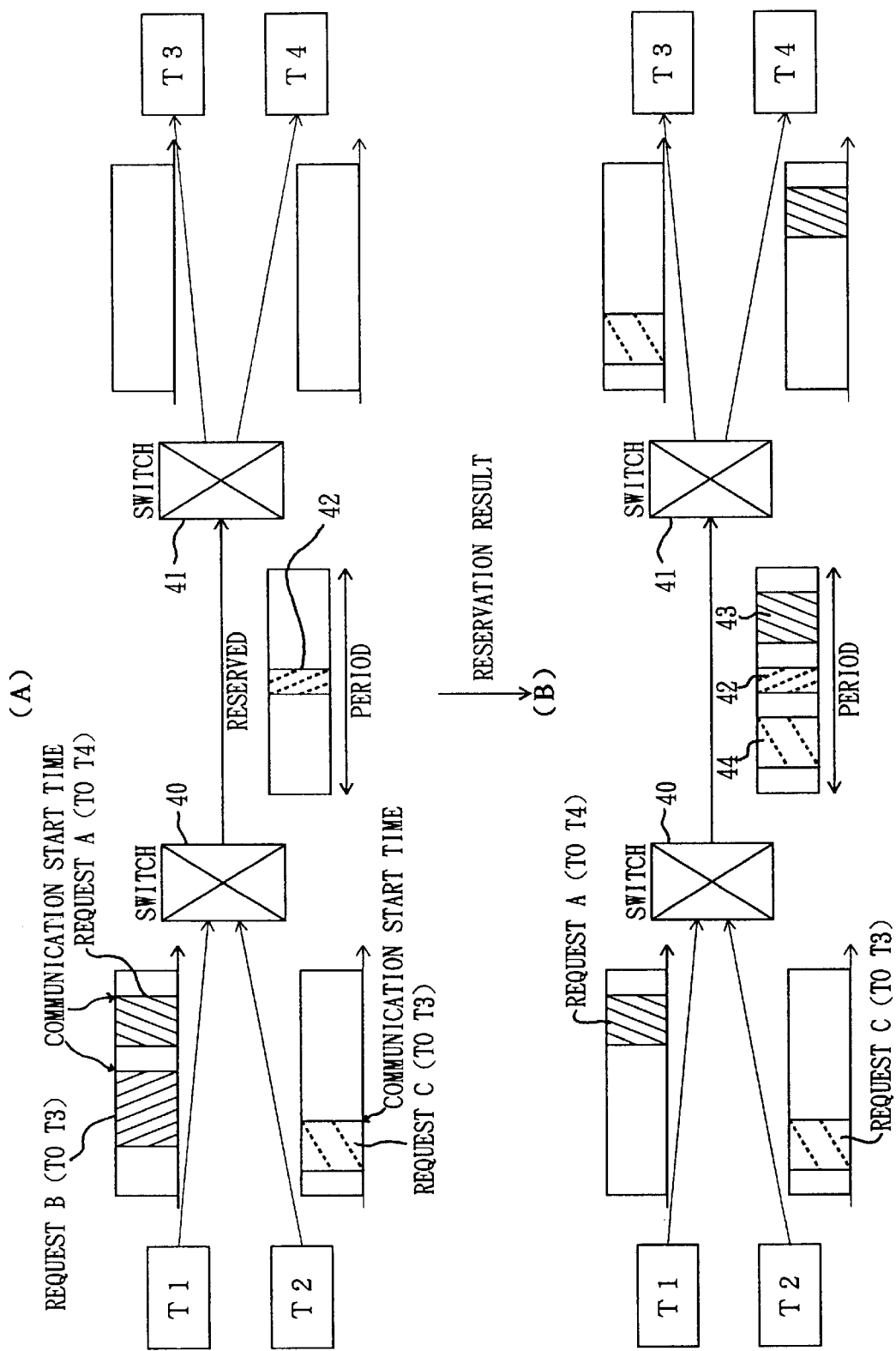
F I G. 17

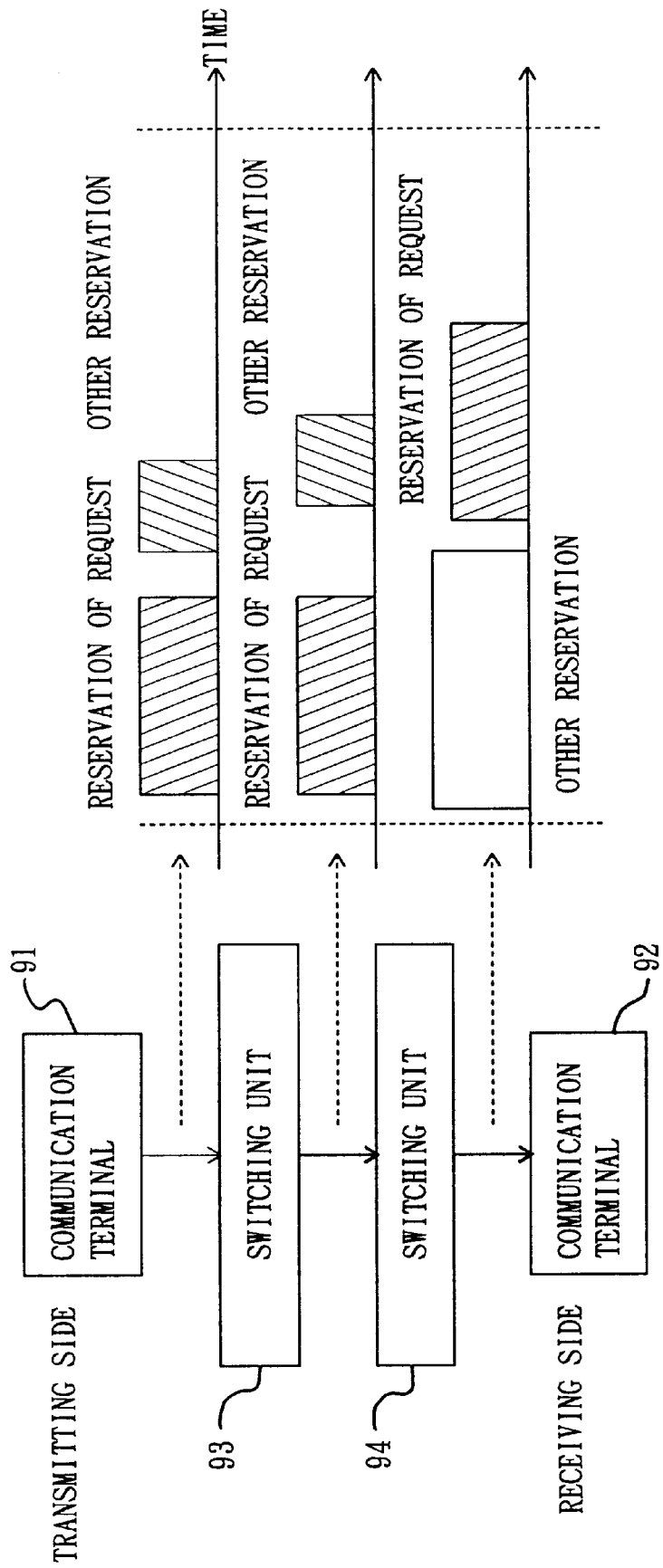
F I G. 25

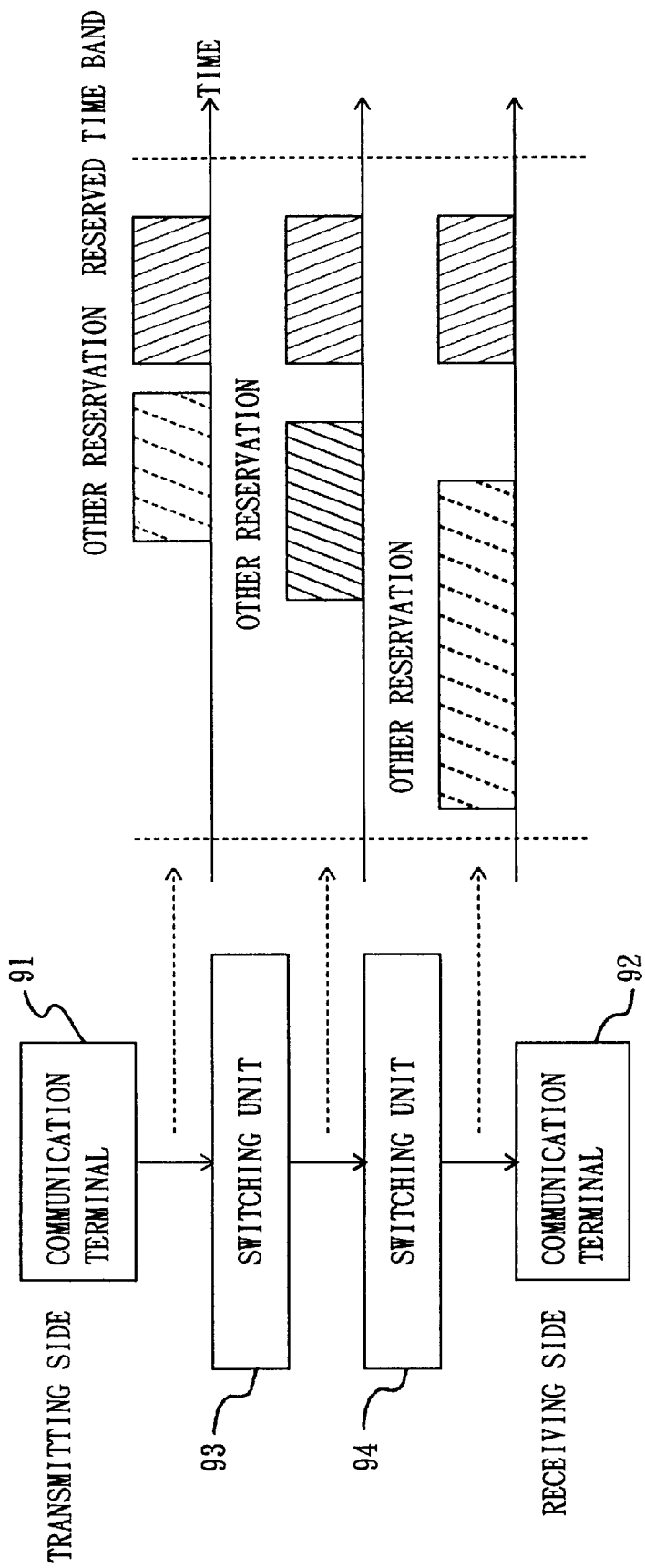
F I G. 2 6

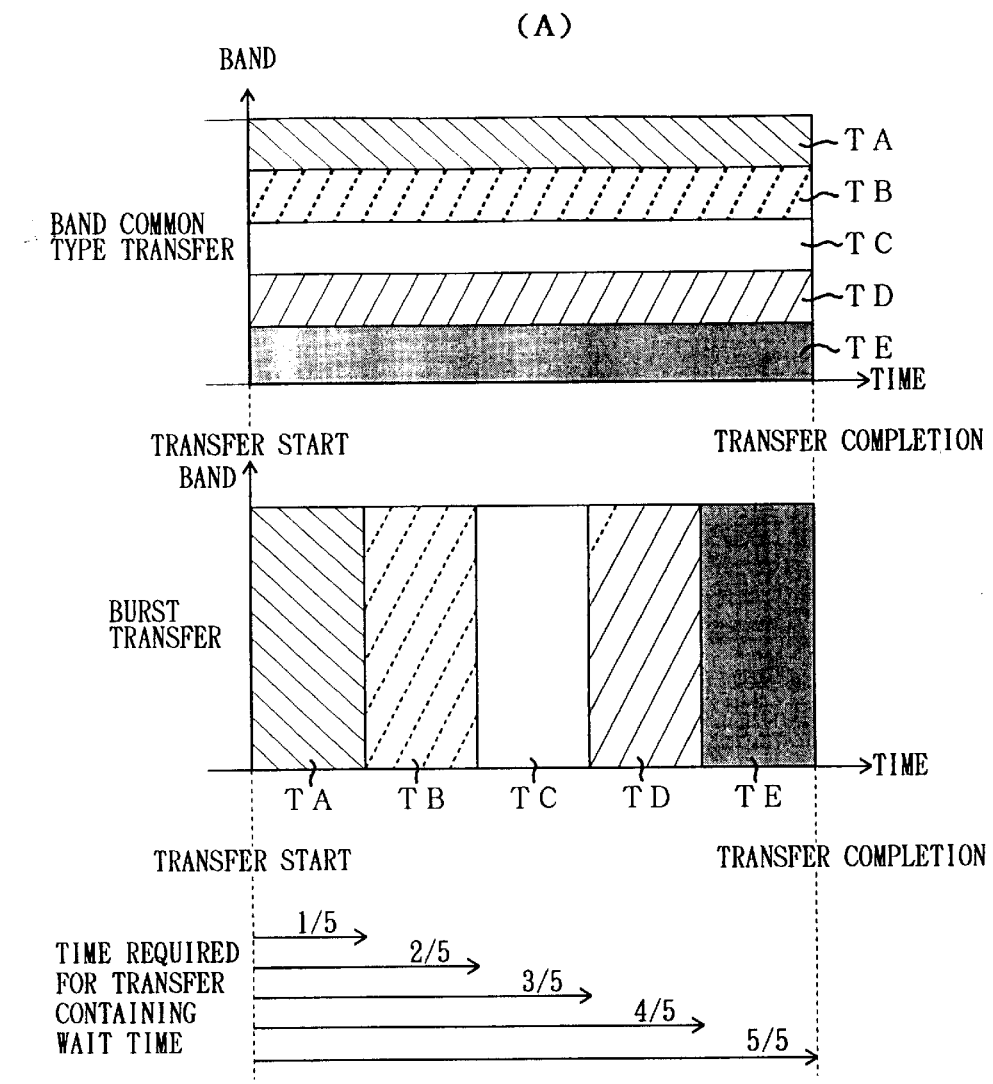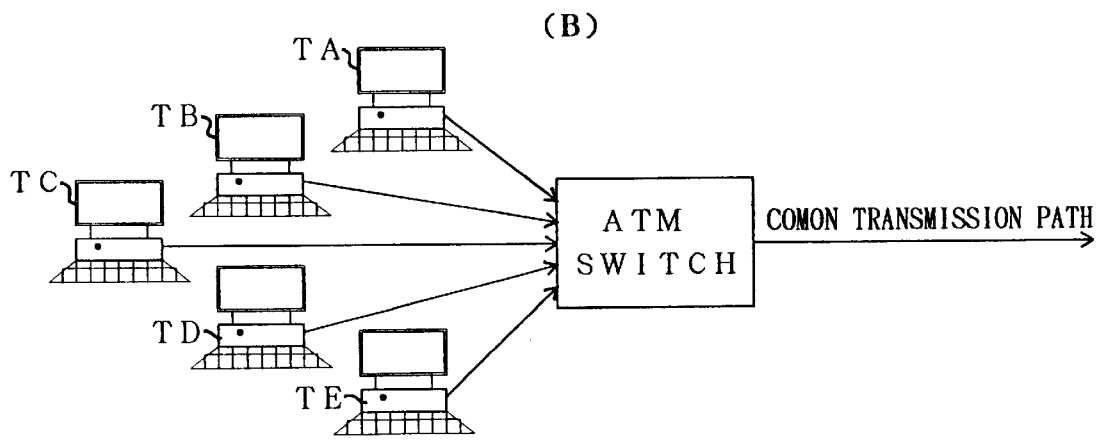
FIG. 30

BURST TRANSFER SYSTEM

BACKGROUND OF THE INVENTION

1. Field of the Invention

The present invention relates to a burst transfer system in a label multiplex system or a time-division multiplex system.

2. Description of the Related Art

There have been known, as data communication system, label multiplex systems such as ATM (Asynchronous Transfer Mode) or a packet transfer system, a time-division multiplex system that allocates time slots.

The ATM system as one of the label multiplex systems is that data is divided into 48 bytes, a header of 5 bytes is added to data of 48 bytes to form an ATM cell consisting of 53 bytes to be transferred. Those ATM cells are multiplexed in accordance with the amount of transmission of the ATM cells from a plurality of communication terminals and then transferred to a host device or a communication terminal at a receiving side through a communication network.

The ATM switch device constituting the communication network, in the case of transmitting the ATM cell from a plurality of input paths to the same output path, transfers the ATM cells after being temporally stored in a buffer memory upon the ATM cell collides with each other.

Because the capacity of the buffer memory in this case is limited, a large number of ATM cells toward the same output path are generated, resulting in an overflow of the buffer memory. In this case, the ATM cells which have overflown are abandoned.

For that reason, the communication network of the ATM system uses the communication control system which is called "flow control system".

In the flow control system, the communication terminals at the respective transmitting sides propose a band to be used for transmission to the communication network.

The communication network that receives the proposal from the communication terminal judges whether the proposed band is ensured or not, on the basis of the use state of the transmission path or the band or the like which has been reported from the communication terminal at other transmitting side.

The communication network, upon judging that the band reported from the communication terminal can be ensured, ensures the transfer of the ATM cell within the reported band. Further, the communication network, in the case that the ATM cell transmitted from the communication terminal exceeds the reported band, abandons the ATM cell transmitted over the band in priority.

On the other hand, the time-division multiplex system is a system in which a plurality of time slots that constitute a frame having a predetermined length are allocated to the communication terminal, respectively, and data from the respective communication terminals is inserted into the time slot which has been allocated to its communication terminal and transferred.

By the way, in the label multiplex system such as the ATM system, in the case where the communication terminal having an amount that exceeds the previously proposed band has been transferred (burst transfer), if another communication terminal also transfers the ATM cell having a relatively large amount, it causes a busy state such as the overflow of the buffer memory within a communication network, or the like to be generated, thereby abandoning the ATM cell. For that reason, the label multiplex system makes it difficult to conduct burst transfer.

Also, in the time-division multiplex system, if a plurality of continuous time slots are allocated to the communication terminal, the burst transfer can be conducted.

However, in the case where a plurality of switching units exist in the path of the burst transfer, it is necessary to synchronize the positions of the time slots that conduct the burst transfer between those switching units, thereby making it difficult to allocate the continuous time slots through a plurality of switching units.

SUMMARY OF THE INVENTION

In view of the above, an object of the present invention is to provide a technique in which the burst transfer is conducted in the label multiplex system or the time-division multiplex system.

A burst transfer system of the present invention is designed such that a communication terminal reserves a band to be used in the burst transfer prior to the execution of the burst transfer whereas a communication network side ensures the burst transfer to be conducted in the reserved band.

For example, the communication network includes request receiving means, communication request analyzing means, path setting means and band reserving means.

The request receiving means receives a communication reservation request of burst transfer from the communication terminal. The communication reservation request received by the request receiving means is inputted to the communication request analyzing means.

The communication request analyzing means analyzes the inputted communication reservation request, and discriminates a destination address and use band information representing a band to be used for the burst transfer.

A destination address which has been discriminate d by the communication request analyzing means is inputted to the path setting means whereas use band information is inputted to the band reserving means.

At first, the path setting means into which the destination address has been inputted discriminates a path through which the communication terminal and the destination can be connected to each other on the basis of the address of the inputted destination. Information representative of the path discriminated by the path setting means is inputted into the band reserving means.

Subsequently, the band reserving means into which the use band information and path information have been inputted discriminates whether or not a path that satisfies a condition represented by the use band information exists in the paths represented by the inputted path information.

In this example, in the case where the path that satisfies the condition represented by the use band information exists in the paths represented by the inputted path information, the band reserving means reserves that path. Further, the band reserving means transmits information representing that the communication reservation request has been received by the band reserving means to the communication terminal.

The communication terminal that has received the information representing that the communication reservation request has been received reserves a resource within the communication terminal, and transmits the burst data at a reservation time.

According to the burst transfer system of the present invention, the path to be used for the burst transfer is reserved prior to the burst transfer, thereby being capable of ensuring the burst transfer.

BRIEF DESCRIPTION OF THE DRAWINGS

The accompanying drawings, which are incorporated in and constitute a part of this specification, illustrate (an) embodiment(s) of the invention and, together with the description, serve to explain the objects, advantages and principles of the invention. In the drawings, FIG. 1 is a block diagram explanatorily showing the concept of the present invention;

FIG. 3 is a block diagram showing the structure of an ATM switch;

FIG. 7 is a diagram showing an example of a communication reservation request;

FIG. 17 is an explanatory diagram showing a communication reservation request by a communication start time and a communication time length;

FIG. 25 is an explanatory diagram showing the reservation on a plurality of link paths;

FIG. 26 is an explanatory diagram showing reservation on a plurality of link paths;

FIG. 30 is an explanatory diagram showing a transfer process time.

DETAILED DESCRIPTION OF THE PREFERRED EMBODIMENTS

Figure 2:
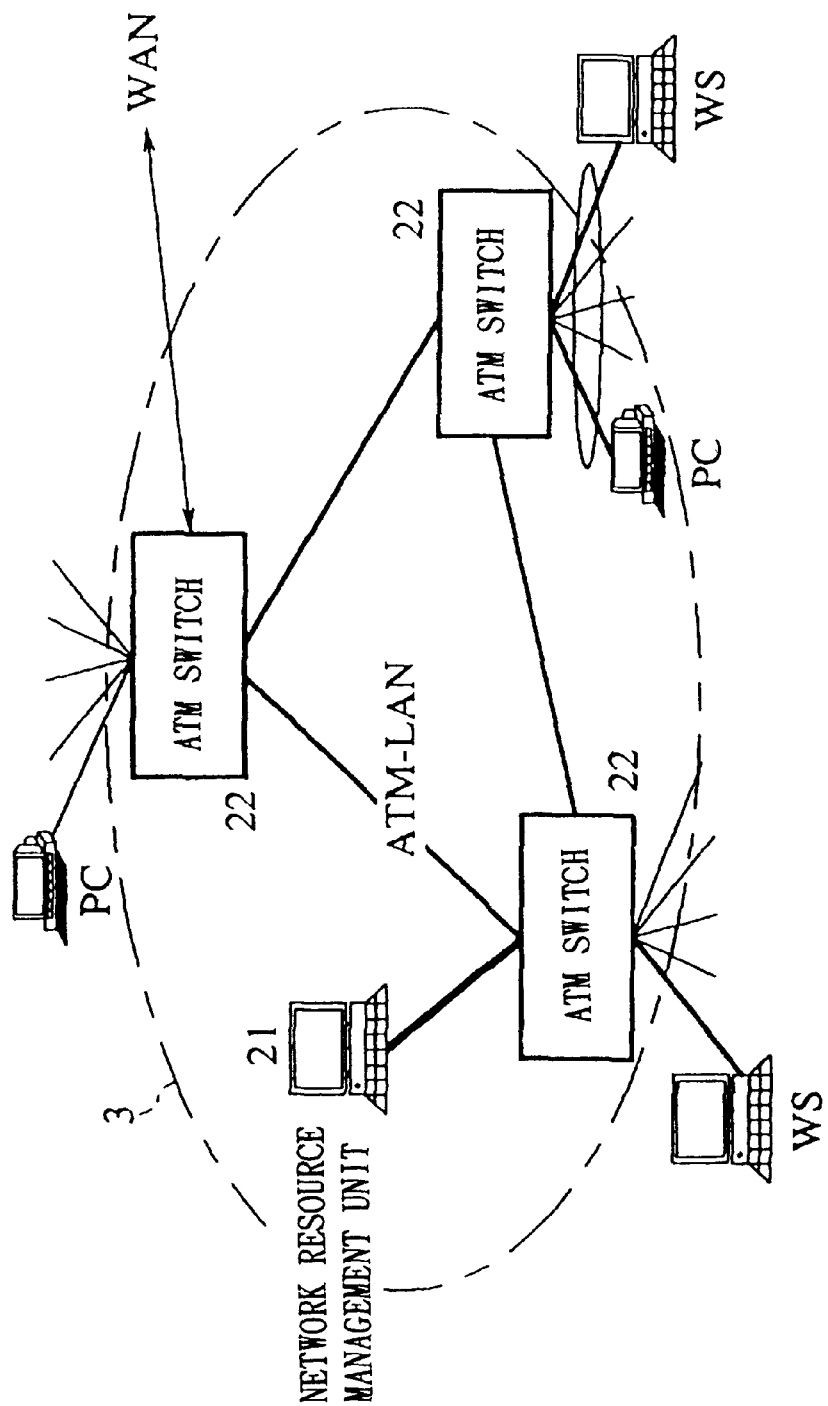
FIG. 2 is a schematic structural diagram showing a communication network to which a burst transfer system of the present invention is applied.

Now, a description will be given in more detail of embodiments of the present invention with reference to the accompanying drawings.

First, the concept of a burst transfer method in accordance with the present invention will be described with reference to FIG. 1.

In the figure, a communication network 3 is a communication network that conducts the delivery of data between terminals through the label multiplex system or the time-division multiplex system, and includes a request receiving section 4, a communication request analyzing section 5, a path setting section 6 and a band reserving section 7.

The request receiving section 4 receives a communication reservation request A or a communication reservation request B of burst transfer from a communication terminal 1 or a communication terminal 2.

The communication request analyzing section 5 analyzes the communication reservation request A or B which has been received by the request receiving section 4 to output destination address information 10 representing a destination of the communication terminal 1 or 2, and request band information 11 representing a band to be used for conducting the burst transfer by the communication terminal 1 or 2.

The destination address information 10 outputted from the communication request analyzing section 5 is inputted into the path setting section 6, and the request band information 11 is inputted into the band reserving section 7.

The path setting section 6 into which the destination address information 10 has been inputted discriminates a path through which the communication terminal 1 or 2 and the destination are connected to each other with reference to the inputted destination address information 10. The path which has been determined by the path setting section 6 is inputted to the band reserving section 7 as the communication path information 12.

In this situation, the band reserving section 7 inputs the request band information 11 from the communication request analyzing section 5 and the communication path information 12 from the path setting section 6. The band reserving section 7 to which those information 11 and 12 have been inputted discriminates whether or not a path (having an unused band more than the request band) that satisfies a condition indicated by the request band information 11 exists in the path represented by the communication path information 12.

In this situation, in the case where the path that satisfies a condition (having an unused band more than the request band) indicated by the request band information 11 exists in the path represented by the communication path information 12, the band reserving section 7 conducts a reservation process on the basis of the request band information 11 and the path information 12.

Hereinafter, the burst transfer system of the present invention will be described in more detail.

FIG. 2 is a diagram showing one example of a communication network that realizes a burst transfer method in accordance with the present invention.

In the figure, a communication network 3 is a local area network (LAN) having an ATM switch, a packet switch and so on.

The communication network 3 includes three ATM switches 22 and a network resource management unit 21 connected to one of those three ATM switches 22.

Each of the ATM switches 22 are connected with a personal computer PC as a communication terminal for ATM, a work station WS and so on.

The above network resource management unit 21, upon receiving a communication reservation request of the burst transfer from the personal computer PC, the work station WS or the like, controls the burst transfer in the communication network 3. It should be noted that in the example shown in FIG. 2, the ATM-LAN connecting between the ATM switch 22 is centralizedly controlled by the network resource management unit 21, however, the function of the network resource management unit 21 may be decentralizedly controlled with an ATM switch 22.

FIG. 3 is a diagram showing the structure of an ATM switch 22.

The ATM switch 22 includes an switching unit 51, a plurality of output control units 52, a present-time obtaining unit 55 and a reservation data section 56.

The exchange unit 51 receives an ATM cell from an input path and discriminates an output path of the ATM cell with reference to a virtual path identifier VPI and a virtual channel identifier VCI. Then, the switching unit 51 transfers the received ATM cell to the output control unit 52 corresponding to the discriminated output path.

Each of the output control units 52 includes an output buffer 53 and a cell selection unit 54.

The output buffer 53 stores the ATM cell from the switching unit 51 and outputs the stored ATM cell with a signal from the cell selection unit 54 as a trigger.

The cell selection unit 54 outputs an output command of the ATM cell with reference to the present time information from the present-time obtaining unit 55 and reservation data stored in the reservation data section 56. The output command outputted from the cell selection unit 54 is inputted into the output buffer 53.

The above-mentioned reservation data section 56 stores the communication reservation data of the burst transfer. The communication reservation data is made up of header data (VPI, VCI, etc.) as the address information of the ATM cell to be burst-transferred and reservation time data containing the communication start time, the communication time length and so on of the burst transfer.

In this case, the cell selection unit 54 compares the present-time information from the present-time obtaining unit 55 with the reservation time data of the reservation data section 56. When the present time is identical with the communication start time of the reservation time data, the cell selection unit 54 reads out the header data corresponding to the reservation time data and inputs the read header data to the output buffer 53.

The output buffer 53 into which the header data from the cell selection unit 54 has been inputted sequentially outputs the ATM cell having the same header data (address) with the header data (address) inputted.

Figure 4:
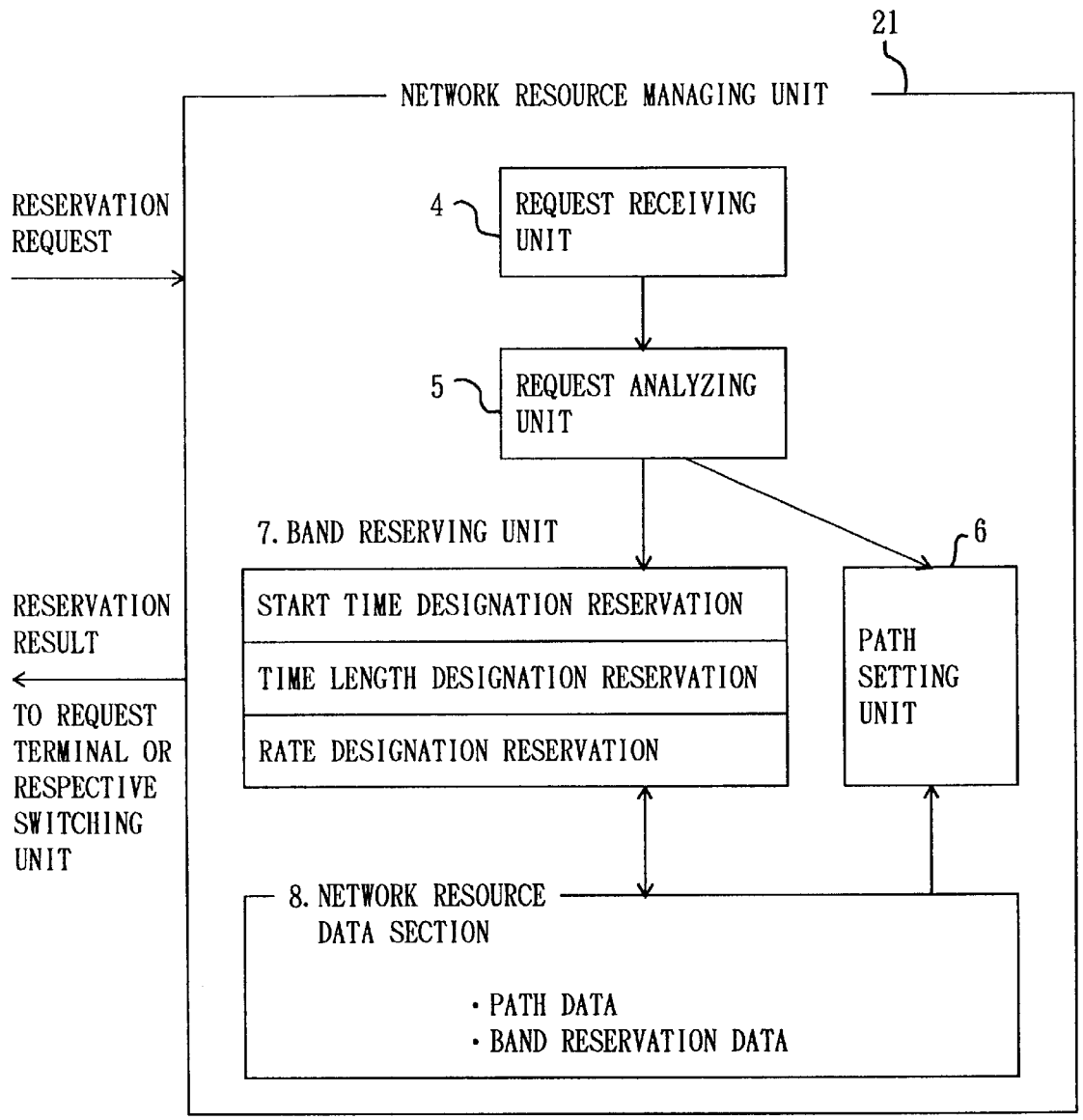
FIG. 4 is a block diagram showing the structure of a network resource management unit.

FIG. 4 is a diagram showing the structure of the network resource management unit 21.

The network resource management unit 21 includes a request receiving unit 4, a request analyzing unit 5, a path setting unit 6, a band reserving unit 7 and a network resource data section 8.

The request receiving unit 4, the request analyzing unit 5, the path setting unit 6 and the band reserving unit 7 may be made up of an exclusive hardware, respectively, and may be constituted as a function which is realized with the execution of the application program by a processor.

The request receiving unit 4 receives the communication reservation request of the burst transfer from the communication terminal such as a personal computer PC, a work station WS and so on. The communication reservation request received by the request receiving unit 4 is inputted into the request receiving unit 5.

The request analyzing unit 5, upon inputting the communication reservation request from the request receiving unit 4, analyzes the inputted communication reservation request. In this situation, it is assumed that the communication reservation request includes the address (a transmitting side address) of the communication terminal of a requester, the address (a receiving side address) of the destination, the start time of the burst transfer, and band information represented by the communication time length or band information represented by the rate of a use time to a given period.

In this example, the request analyzing unit 5 extracts the transmitting side address and receiving side address from the communication reservation request, and allows the extracted transmitting side address and the receiving side address to be inputted into the path setting unit 6.

Also, the request analyzing unit 5 extracts the communication start time and the band information from the communication reservation request and inputs the extracted communication start time and the band information into the band reserving unit 7.

The path setting unit 6, upon inputting the transmitting side address and the receiving side address from the request analyzing unit 5, discriminates all the paths that enable the transmitting side address and the receiving side address to be connected to each other with reference to the path data stored in the network resource data section 8.

The information representative of the paths discriminated by the path setting unit 6 is inputted into the band reserving unit 7.

The band reserving unit 7, upon inputting the communication start time and the band information from the request analyzing unit 5 and the path information from the path setting unit 6, discriminates a path having an unused band after the communication start time in the paths discriminated by the path setting unit 6 with reference to the band reserving data stored in the network resource data section 8. Furthermore, the band reserving unit 7 discriminates a path having an unused band more than a band specified by the band information in the path having the unused band after the communication start time.

In the case where it is discriminated that there exists the path having an unused band more than a band specified by the band information in the path having the unused band after the communication start time, the band reserving unit 7 conducts the reservation process of the discriminated path.

The reservation process conducted by the band reserving unit 7 includes a process for transmitting to the communication terminal of the requester for a communication reservation request the information representing that reservation has been booked, a process for writing the band reserving information containing the communication start time, the band information and the path information in the network resource data section 8, a process for transmitting the communication start time, the band information and the path information to the ATM switch 22, and so on.

On the other hand, in the case where there exist no path having an unused band in the path after the communication start time, or in the case where there exists no path having an unused band more than a band specified by the band information in the paths having the unused band after the communication start time, the band reserving unit 7 transmits to the communication terminal of the requester for a communication reservation request the information representing that reservation is not acceptable.

Figure 5:
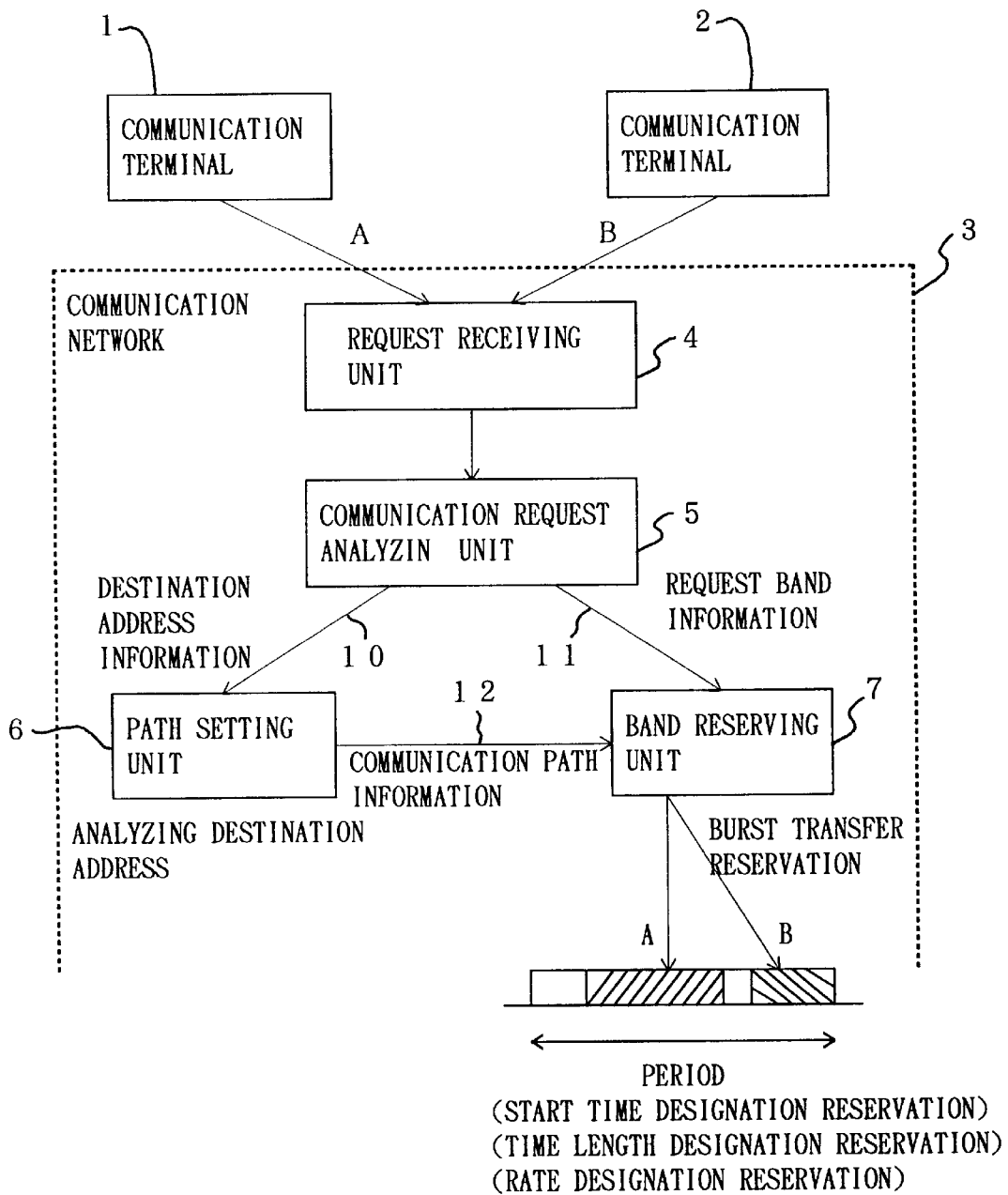
FIG. 5 is a block diagram explanatorily showing the operation of the burst transfer system.

FIG. 5 is a diagram for explaining an embodiment that realizes the burst transfer method in accordance with the present invention.

The communication network 3 is connected with the communication terminal 1 and the communication terminal 2.

The communication network 3 includes the request receiving unit 4, the request analyzing unit 5, the path setting unit 6, and the band reserving unit 7 of the above-mentioned network resource management unit 21.

The communication terminals 1 or 2, in the case of conducting communication through the burst transfer to another communication terminal not shown, transmit the communication reservation request A or B containing therein the address of the communication terminal 1 or 2 (transmitting side address), the address of another communication terminal (receiving side address), the communication start time and the band information to the request receiving unit 4 of the network resource management unit 21.

The request receiving unit 4 receives the communication reservation request A or B and transfers the received communication reservation request A or B to the communication request analyzing unit 5.

The communication request analyzing unit 5, upon receiving the communication reservation request A or B from the request receiving unit 4, analyzes the communication reservation request A or B. Then, the communication request analyzing unit 5 extracts the transmitting side address and the receiving side address from the communication reservation request A or B and then transfers the extracted transmitting side address and the receiving side address (destination address information 10) to the path setting unit 6.

Also, the communication request analyzing unit 5 extracts the communication start time and the band information from the communication reservation request A or B and then transfers the extracted communication start time and the band information (request band information 11) to the band reserving unit 7.

The path setting unit 6 compares the destination address information 10 with the path data stored in the network resource data section 8 to discriminate all the paths through which the transmitting side address and the receiving side address can be connected. The information representing the discriminated path (communication path information 12) is transferred to the band reserving unit 7.

The band reserving unit 7, upon receiving the request band information 11 and the communication path information 12, judges whether or not a path that satisfies the condition of the request band information 11 exists in the paths represented by the communication path information 12.

In the case where the path that satisfies the condition of the request band information 11 exists in the paths represented by the communication path information 12, the band reserving unit 7 transmits the information (reservation result) representing that the communication reservation request has been booked to the communication terminal 1 or 2 of the requester. Further, the band reserving unit 11 transmits the transmitting side address, the receiving side address, the communication start time, the band information and the path information to the ATM switch 22.

In this case, the communication terminal 1 or 2, upon receiving the information representing that the communication reservation request has been booked, reserves the resource such as a card, a module or a port within the communication terminal 1 or 2.

As a result, within a predetermined period or a variable period where the period is changed in correspondence with the communication amount, the communication terminal 1 or 2 can conduct the burst transfer from the communication start time.

On the other hand, in the case where the path that satisfies the condition of the request band information 11 does not exist in the paths represented by the communication path information 12, the band reserving unit 7 transmits the information (reservation result) representing that the communication reservation request is not acceptable to the communication terminal 1 or 2 of the requester.

Figure 6:
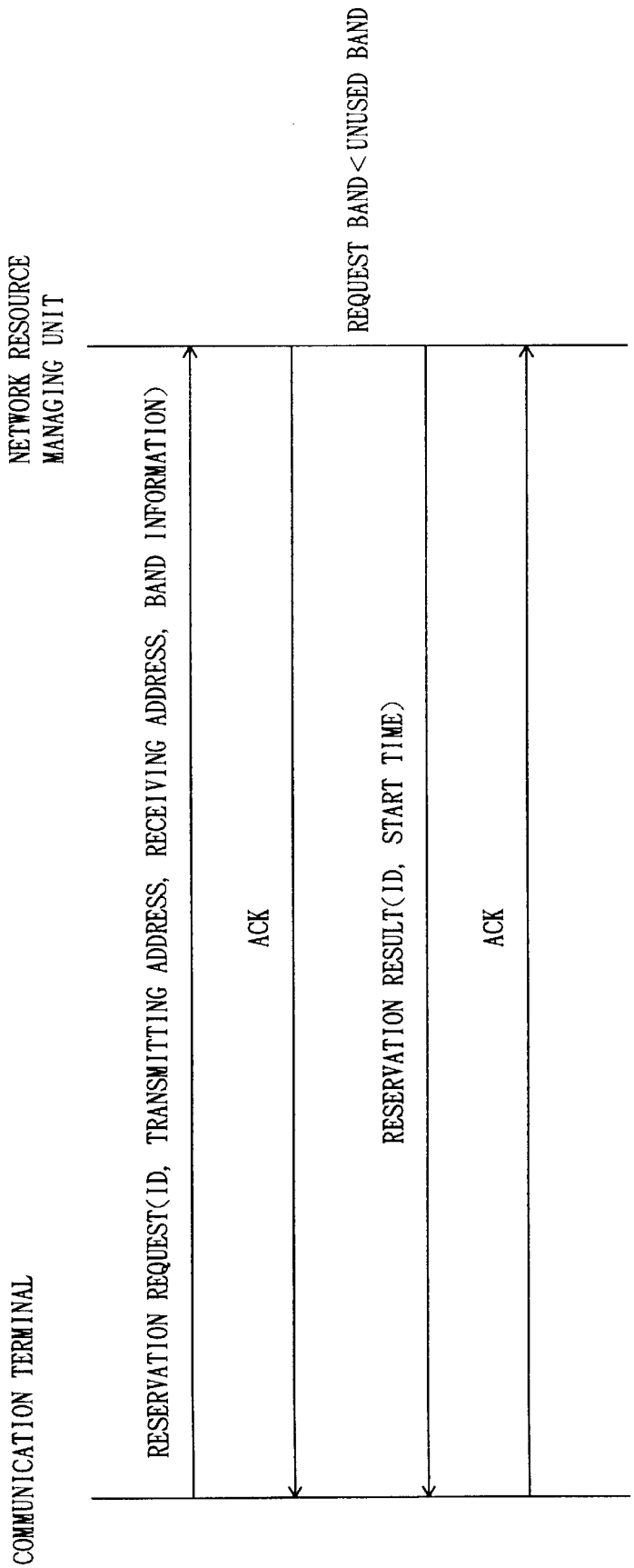
FIG. 6 is a sequence diagram explanatorily showing a signal transmitted and received between a communication terminal and the network resource management unit.

FIG. 6 is a sequence diagram showing a signal transmitted and received between the communication terminal of the transmitting side and the network resource management unit.

The communication terminal of the transmitting side transmits to the network resource monitoring unit a communication reservation request containing an ID inherent to each terminal, the transmitting side address, the receiving address and the band information.

On the contrary, the network resource management unit transmits information representing that the communication reservation request has been received (ACK) to the communication terminal.

Furthermore, the network resource management unit compares information contained in the communication reservation request from the communication terminal with data stored in the network resource data section to judge whether or not the communication reservation request can be received.

In the case where it is judged that the communication reservation request can be received, the network resource management unit transmits the ID of the communication terminal and the start time of the burst transfer to the communication terminal as a reservation result.

On the other hand, in the case where it is judged that the communication reservation request is not acceptable, the network resource management unit transmits to the communication terminal the information representing that the communication reservation request is not acceptable as a reservation result.

The communication terminal, upon receiving a reservation result from the network resource management unit, transmits a signal ACK representing that the communication reservation request has been received to the network resource management unit.

FIG. 7 is a diagram showing one example of the communication reservation request.

ID denotes an inherent number of the communication terminal, VPI, VCI or the like; DST is a transmitting side address; ORG is a receiving side address; SIZE is a communication amount; TIME is a desired communication start time; PERIOD is a generation interval; and PSIZE is a generation unit.

In this case, the inherent number ID, the transmitting side address DST, the receiving side address ORG and the communication amount SIZE are essential items, whereas the desired communication start time, the generation interval PERIOD and the generation unit PSIZE are optional items.

It should be noted that the contents of the essential items and the optional items can be changed appropriately, and other contents can be added.

Figure 8:
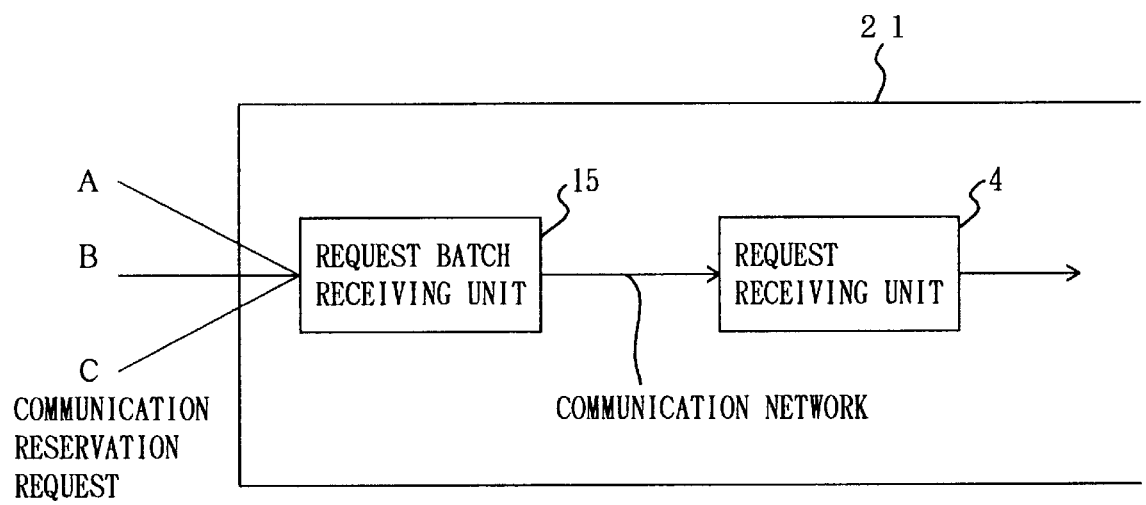
FIG. 8 is a block diagram showing another embodiment of the network resource management unit.
Figure 9:
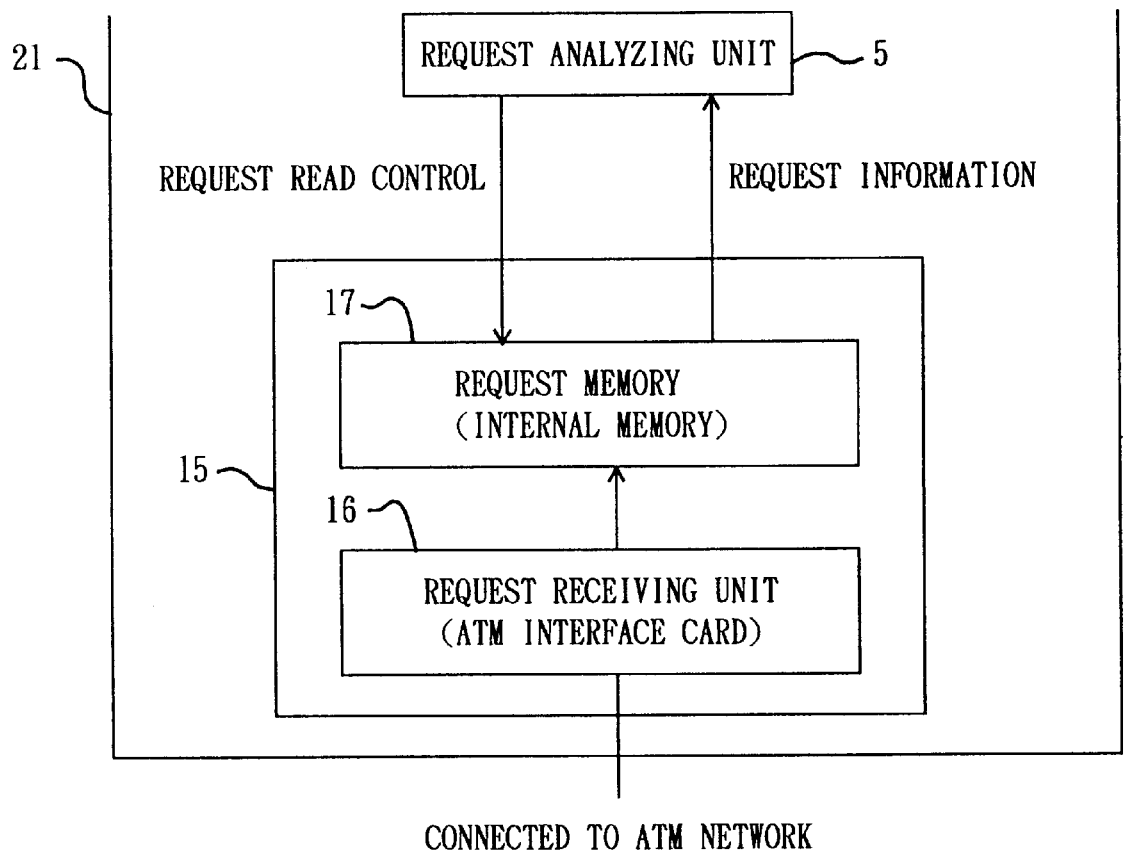
FIG. 9 is a block diagram showing still another embodiment of the network resource management unit.

FIGS. 8 and 9 are diagrams showing another embodiment of the network resource management unit 21.

The network resource management unit 21 includes a request batch receiving unit 15 in addition to the structure described in the above-mentioned embodiment.

The request batch receiving unit 15, in the case where communication reservation requests of the burst transfer from a plurality of communication terminals are generated simultaneously, receives those communication reservation requests.

The request batch receiving unit 15, upon receiving a plurality of communication reservation requests A, B and C simultaneously, sequentially transfers them to request receiving unit 4.

It should be noted that in the case where the network resource management unit 21 includes plural sets of the request receiving units 4 and the request analyzing units 5 so that communication reserving processes are conducted in parallel, the batch receiving unit 15 transmits a plurality of communication reserving requests A, B and C to the request receiving unit in parallel.

The request batch receiving unit 15 includes a request receiving unit 16 made up of an ATM interface card and a request memory 17.

The request receiving unit 16 receives the communication reservation request of the burst transfer from a plurality of communication terminals through the ATM network. A plurality of communication reservation requests received by the request receiving unit 16 is inputted into the request memory 17.

The request memory 17, upon inputting thereinto the plural reserving requests A, B and C from the request receiving unit 16, stores those communication reservation requests A, B and C therein.

Then, the request memory 17 outputs one of the stored communication reservation requests A, B and C with the fact that a signal from the request analyzing unit 5 being inputted as a trigger.

Furthermore, the request memory 17 outputs one of two remaining communication reservation requests with the fact that a signal from the request analyzing unit 5 being inputted as a trigger.

Still further, the request memory 17 outputs one remaining communication reservation request with the fact that a signal from the request analyzing unit 5 being inputted as a trigger.

In this situation, the order of the communication reservation request outputted from the request memory 17 may be determined in accordance with a predetermined priority. Also, for example, the request memory 17 may outputs a communication reservation request shorter in communication time length than another communication reservation request having a long communication time length in priority. In other words, the request memory 17 outputs the communication reservation request small in communication amount in advance so that a response delay corresponding to the communication reservation request is restrained to the minimum.

Figure 10:
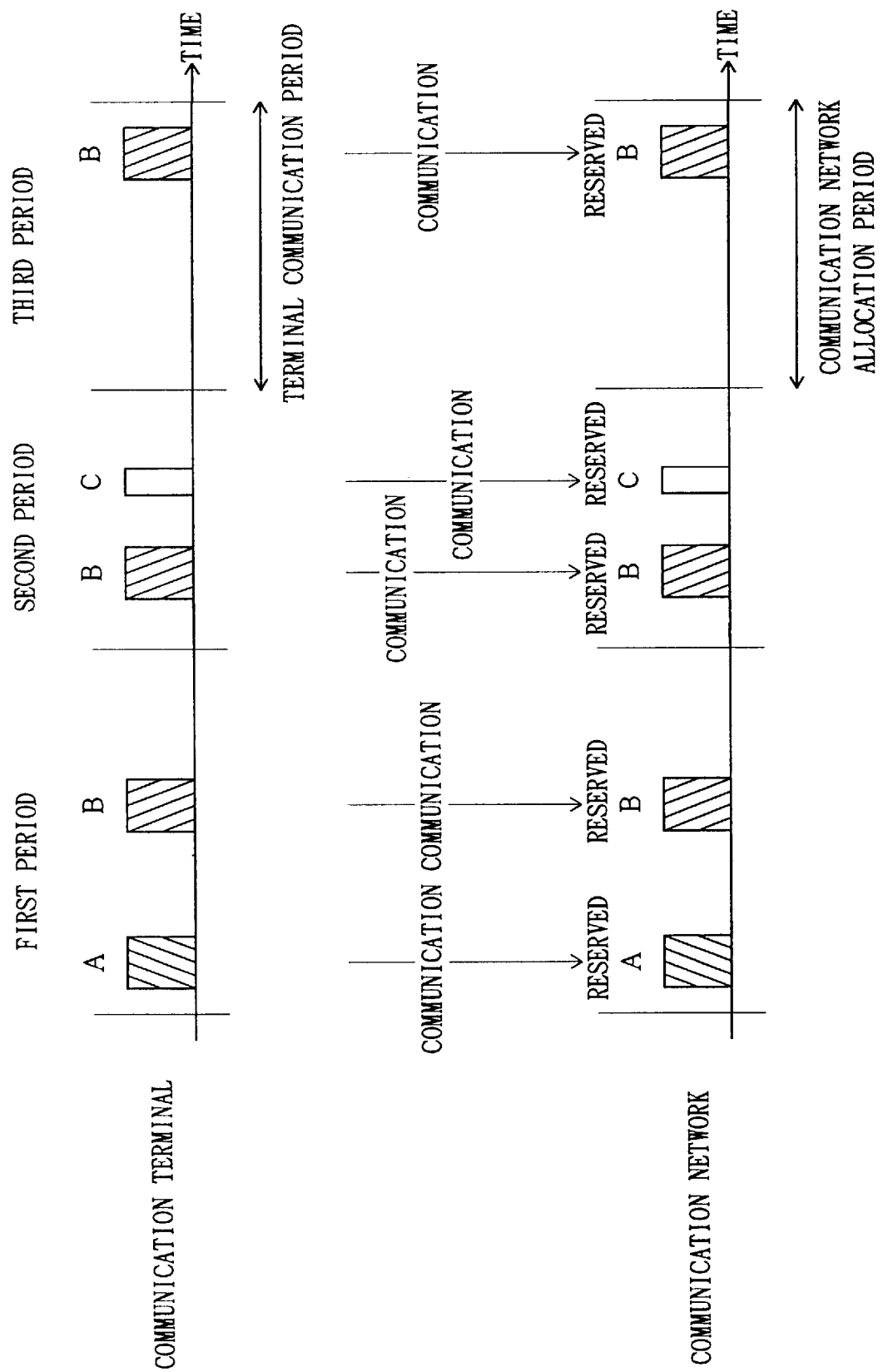
FIG. 10 is an explanatory diagram showing a communication reservation request for each time band.

FIG. 10 is an explanatory diagram showing a communication reservation request for each time band.

FIG. 10 shows a case in which the communication start time and the communication time length are designated for each period, and a reservation is accepted.

Communication is started from the communication terminal in accordance with the communication reservation requests A, B and C from the communication terminal, whereby the communication network conducts the burst transfer in a state where the communication network is exclusively used, as shown in reservations A, B and C.

In this case, a period allocated to the communication terminal and a period of the resource allocation to the communication network can be set in accordance with the communication reservation request or the like from the communication terminal, and therefore time lengths of a first period, a second period and a third period are different from each other. It should be noted the time lengths of the respective periods can be made identical with each other.

Also, FIG. 10 shows a case where the communication terminal starts communication at a reserved communication start time. In the case where a delay is permissible at the communication network side or in the case where an unused time is sufficient, communication can be started at a time when the burst transfer is completed within each period. Also, since the communication path can be set by receiving the communication reservation request, in this case, it is unnecessary to set the communication path every time the burst transfer starts so that the burst transfer process can be started immediately.

Figure 11:
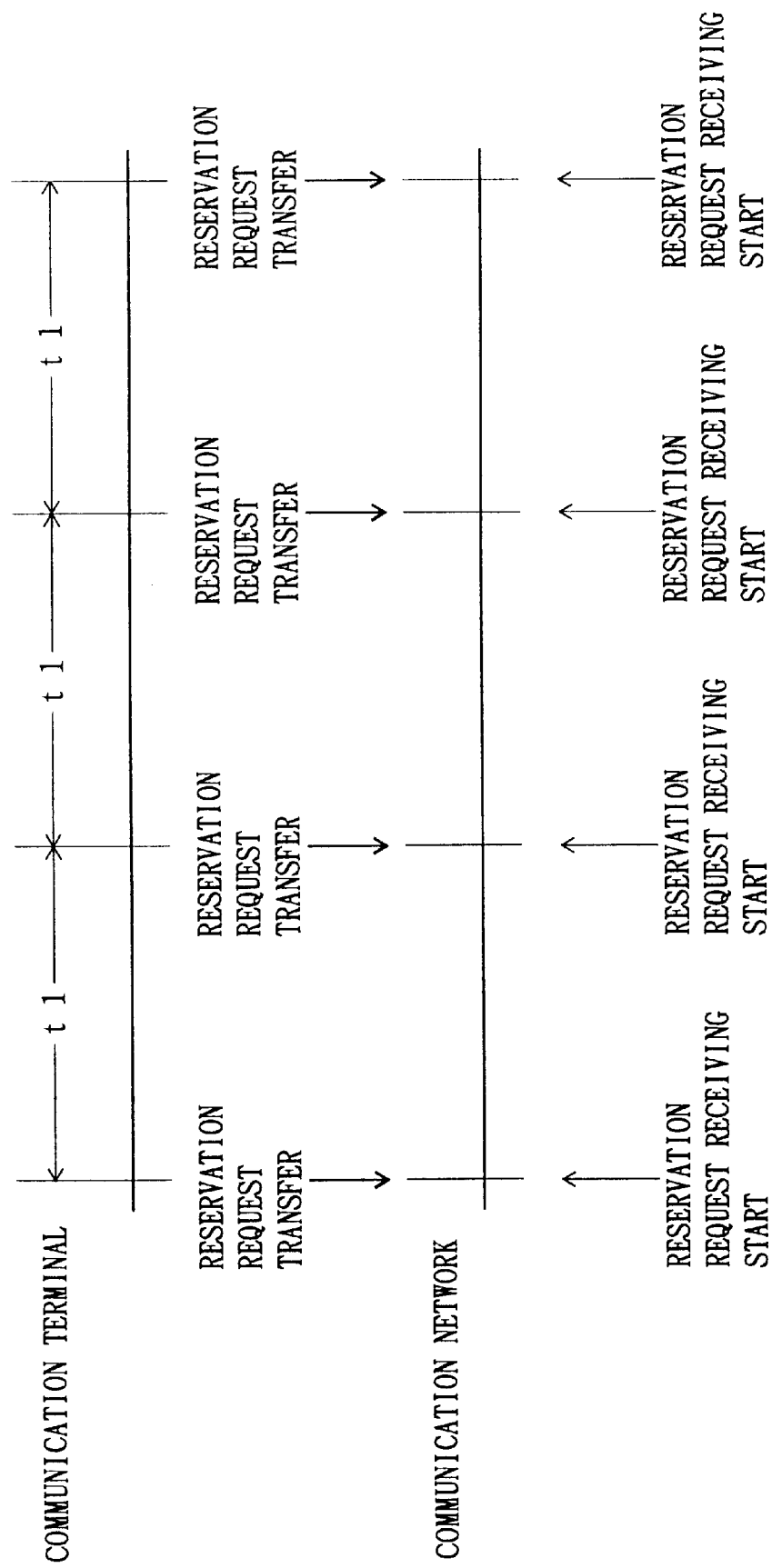
FIG. 11 is an explanatory diagram showing a case of a periodic transfer.

FIG. 11 is an explanatory diagram showing a case of periodic transfer, where the communication network starts to receive the communication reservation request for each given period t1. Hence, since the communication terminal can discriminates the period t1 in advance, it can transfer the communication reservation request to the communication network without any confirmation of whether or not the communication network side is in a reservation request receiving start state, through mutual communication it should be noted that in the case shown in FIG. 10, since each period is not fixed, there is required the mutual communication for discriminating the reservation request receiving start state at the communication network side. Then, upon receiving the communication reservation request by the communication network, the communication terminal can start the burst transfer in the reservation time band of the reserved period.

Figure 12:
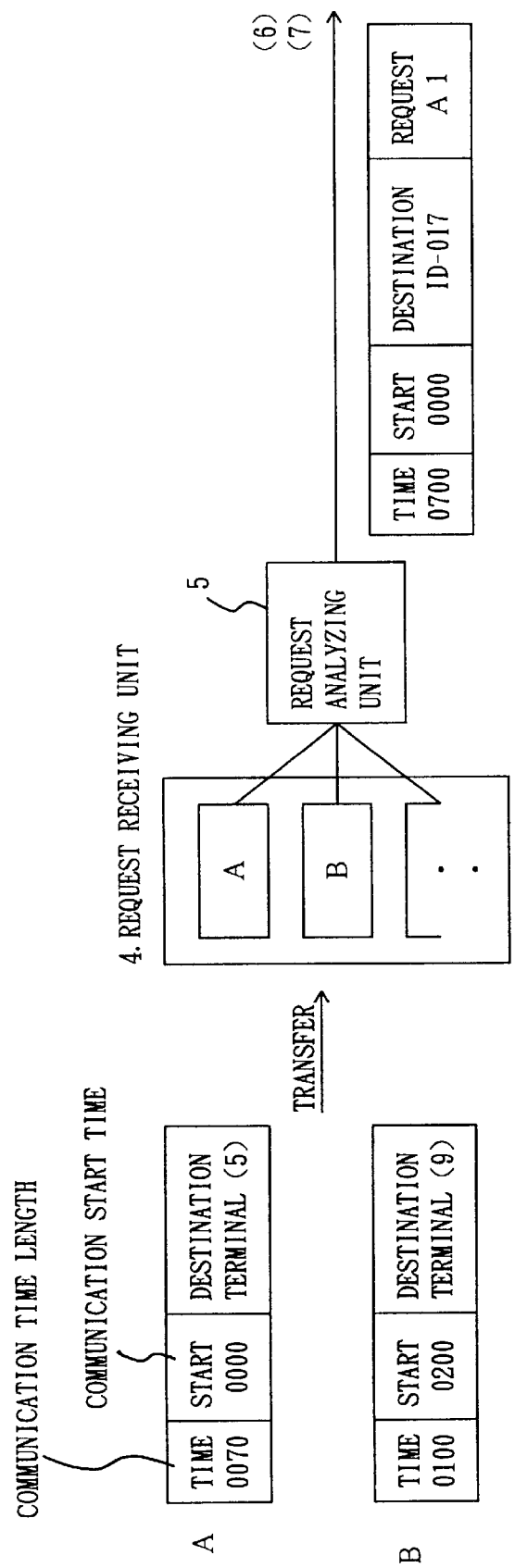
FIG. 12 is an explanatory block diagram showing cases of a start time designation reservation and a time length designation reservation.

FIG. 12 is an explanatory diagram showing cases of the start time designation reservation and the time length designation reservation. FIG. 12 shows a case where communication reservation request A of the burst transfer from the communication terminal includes a communication time length "0070" corresponding to a communication amount, a communication start time "0000", and the communication terminal (destination terminal) ID "5" of the destination, and the communication reservation request B includes a communication time length "0100", a communication start time "0200", and the communication terminal (destination terminal) ID "9" of the destination.

The request receiving unit 4 receives the communication reservation requests A and B, for example, in the format shown in FIG. 7, and reads for example, the communication reservation request A accordance with a read request from the request analyzing unit 5. Then, the request receiving unit 4 discriminates a request band from the communication time length to transfer it to the band reserving unit 7 indicated by (7), and also discriminates the destination information from the communication terminal ID of the destination to transfer it to the path setting unit 6 indicated by (6). Thus, the request receiving unit 4 transfers the communication path information from the path setting unit 6 to the band reserving unit 7. The band reserving unit 7 stores, as reservation information, information containing a communication time length "0070", a communication start time "0000", the ID "ID-017" of the communication network representing the path of the destination, and "A1" of a first communication reservation request.

Also, there is shown a case in which the request analyzing unit 5 sequentially conducts processing. In case of a structure in which the request analyzing unit 5 enables processes in parallel, the request receiving unit 4 can simultaneously read the received communication reservation requests A, B, . . . by the number which can be processed in parallel to process them. Similarly, in the case where the path setting unit 6 and the band reserving unit 7 can process in parallel, a plurality of analysis results can be transferred in parallel and processed.

Figure 13:
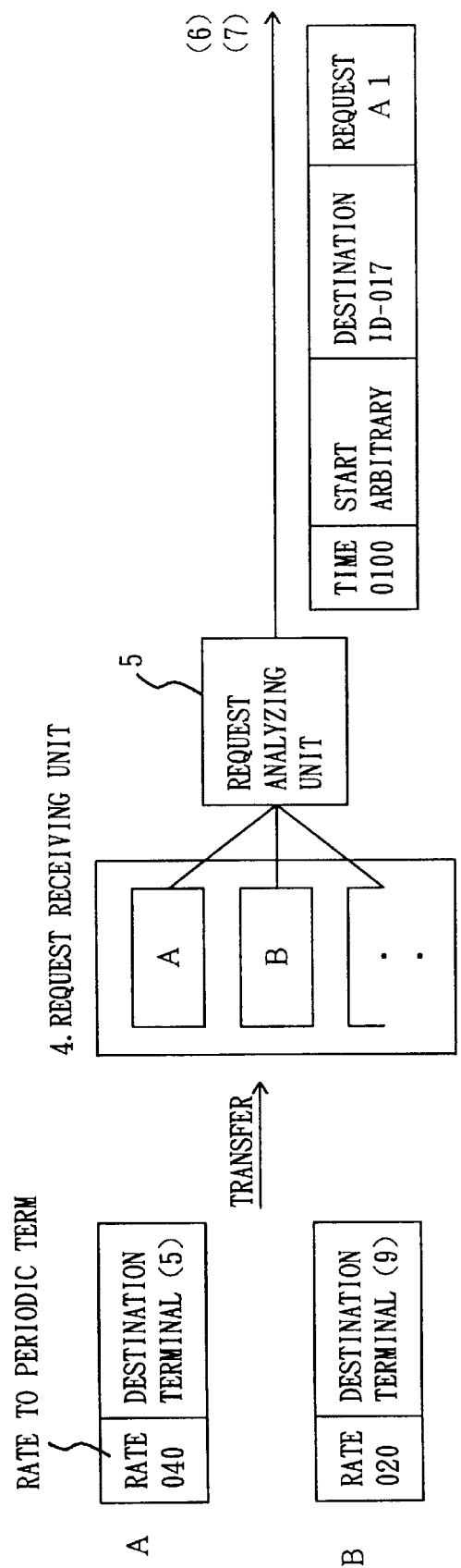
FIG. 13 is an explanatory block diagram showing a case of a rate designation reservation to a period.

FIG. 13 is an explanatory diagram showing a case of a rate designation reservation to a period, and shows a case in which the communication reservation request A for the burst transfer from the communication terminal includes a rate "040" (4% of one periodic length) to the periodic term corresponding to the communication amount, and the communication terminal (destination terminal) ID "5" of the destination. Also, the communication reservation request B includes a rate "020" (2% of one periodic term) to the periodic term corresponding to the communication amount, and the communication term (destination terminal) ID "9" of the destination.

The request receiving unit 4 receives the communication reservation requests A and B and then sequentially transfers the communication reservation requests A and B in accordance with a request from the request analyzing unit 5. As described above, in case of a structure in which the request analyzing unit 5 can process in parallel, the communication reservation requests A and B can be transferred in parallel.

The request analyzing unit 5 sets the communication time length "0100" (for example, in case of the period of 2500 ms, the 4% rate becomes 100 ms) and the communication start time arbitrarily (an arbitrary time within the periodic term) in accordance with the rate "040" to the periodic term, and stores information containing the communication network ID "ID-017" representative of the path of the destination and the first communication reservation request "A1" as reservation information in the band reserving unit 7.

Figure 14:
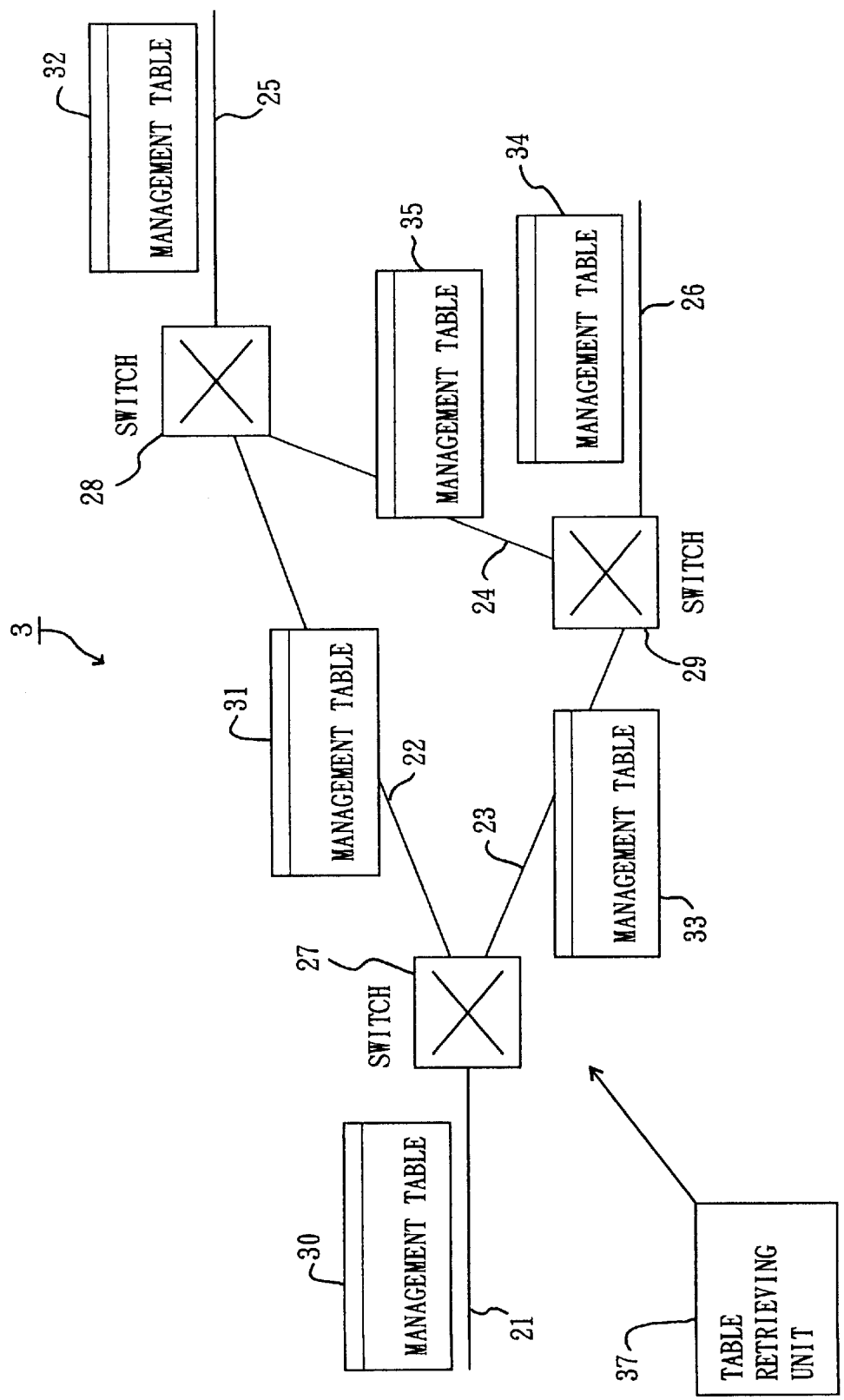
FIG. 14 is an explanatory diagram showing a communication network resource management.

FIG. 14 is an explanatory diagram showing the communication network resource management. In the communication network 3 containing communication paths 21–25 and switches 27–29 that switch the communication paths, there are provided management tables 30 to 35 which are capable of storing the communication start time, the communication time length and the communication terminal ID in correspondence with the communication paths 21 to 25. Also, there is provided a table retrieving unit 3 that retrieves those management tables 30 to 35. The respective management tables 30 to 35 may be disposed in the network resource managing unit that centralizedly controls the communication network 3 or decentralizedly disposed in correspondence with the switches 27 to 29.

Figure 15:
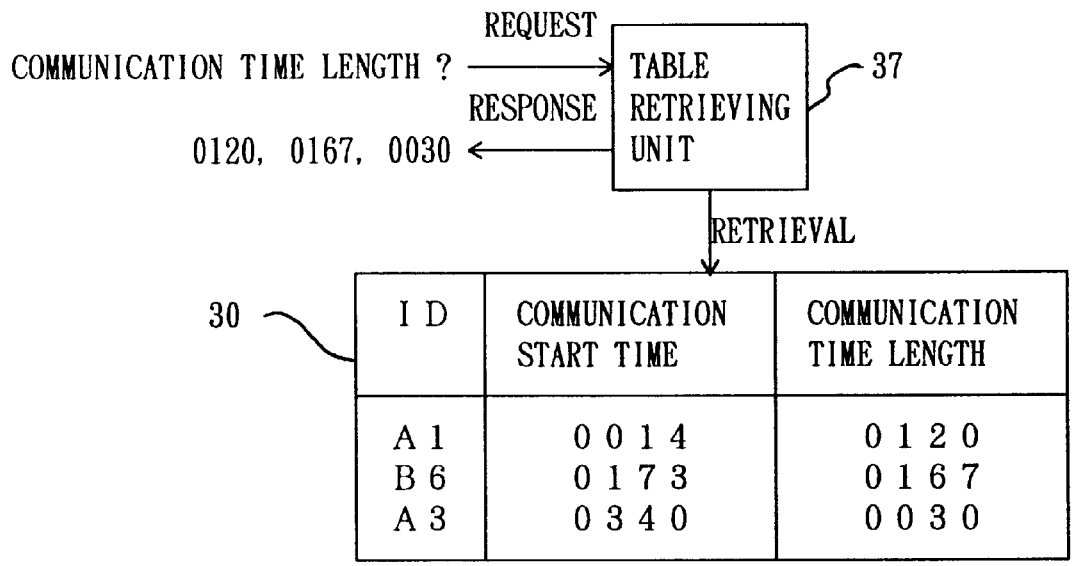
FIG. 15 is an explanatory diagram showing a management table retrieval.

FIG. 15 is an explanatory diagram showing the management table retrieval, and shows a case in which the table retrieving unit 37 retrieves the management table 30 in FIG. 14. The management table 30 includes regions of an inherent number ID under communication, the communication start time and the communication time length, where the ID "A1, B6, A3", the communication start time "0014, 0173, 0340" corresponding to those Ids, and communication time lengths "0120, 0167, 0030" are stored.

For example, in the case of obtaining total time of the communication available time within the period of the communication path 21 (refer to FIG. 14), upon inquiring the communication time length to the table retrieving unit 37, the table retrieving unit 37 reads the communication time length from the management table 30. With the addition of the communication time length "0120", "0167" and "0030", it is found that the communication available time is "0317". As a result, the unused time within the period can be readily obtained, thereby being capable of readily judging whether or not reception is acceptable in the case where the communication reservation request occurs in the communication path 21.

Also, since the table retrieving unit 37 can discriminate the unused time band with the period on the basis of the communication start time and the communication time length of the management table 30, it can be readily judged whether or not start time designation reservation at the time of the communication reservation request can be acceptable, depending upon whether its start time is within the unused time band, or not.

Figure 16:
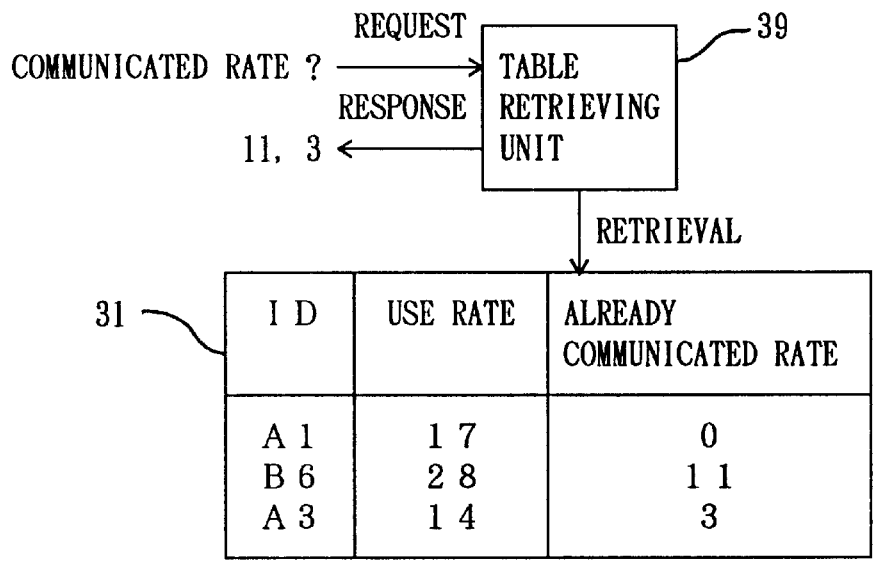
FIG. 16 is an explanatory diagram showing use amount retrieval.

FIG. 16 is an explanatory diagram showing the use amount retrieval, and shows a case in which, for example, as one example of the contents of the management table 31 on the communication path 22 in FIG. 14, the ID "A1, B6, A3", the use rate "17, 28, 14", and an already communicated rate "0, 11, 3" are stored. In the communication path 22, if the already communicated rate is inquired, then the table retrieving unit 39 retrieves the management table 31 and reads the already communicated rate "11, 3" and adds them together, thereby being capable of obtaining the already communicated rate "14" in the communication path 22. In this case, the use rate "17, 28, 14" is read and added together, thereby being capable of grasping the use state of the communication path 22, the unused state of the resource, etc. from the total of the use rate of the communication path 22 in accordance with the communication reservation request and the total of the already communicated rate to the former total.

FIG. 17 is an explanatory diagram showing a communication reservation request in accordance with the communication start time and the communication time length. In a state where communication terminals T1, T2 and communication terminals T3, T4 are connected to each other through switches 40 and 41 of a communication network, (A) is a state where a time band 42 has been already reserved within one period when the communication reservation request A is transmitted from the communication terminal T1 to the communication terminal T4, the communication reservation request B is transmitted from the communication terminal T1 to the communication terminal T3, an the communication reservation request C is transmitted from the communication terminal T2 to the communication terminal T3. Also, the communication reservation requests A, B and C include the communication start time and the communication time length.

In this case, since the communication reservation request B from the communication terminal T1 to the communication terminal T3 overlaps with the reserved time band 42, the communication reservation request B is not received. Hence, as shown in (B), the communication reservation request A from the communication terminal T1 to the communication terminal T4 is received as indicated as reference numeral 43, and the communication reservation request C from the communication terminal T2 to the communication terminal T3 is received as indicated as reference numeral 44, and in the respective communication start times, the burst transfer is conducted from the communication terminal T1 to the communication terminal T4, and also the burst transfer is conducted from the communication terminal T2 to the communication terminal T3.

Figure 18:
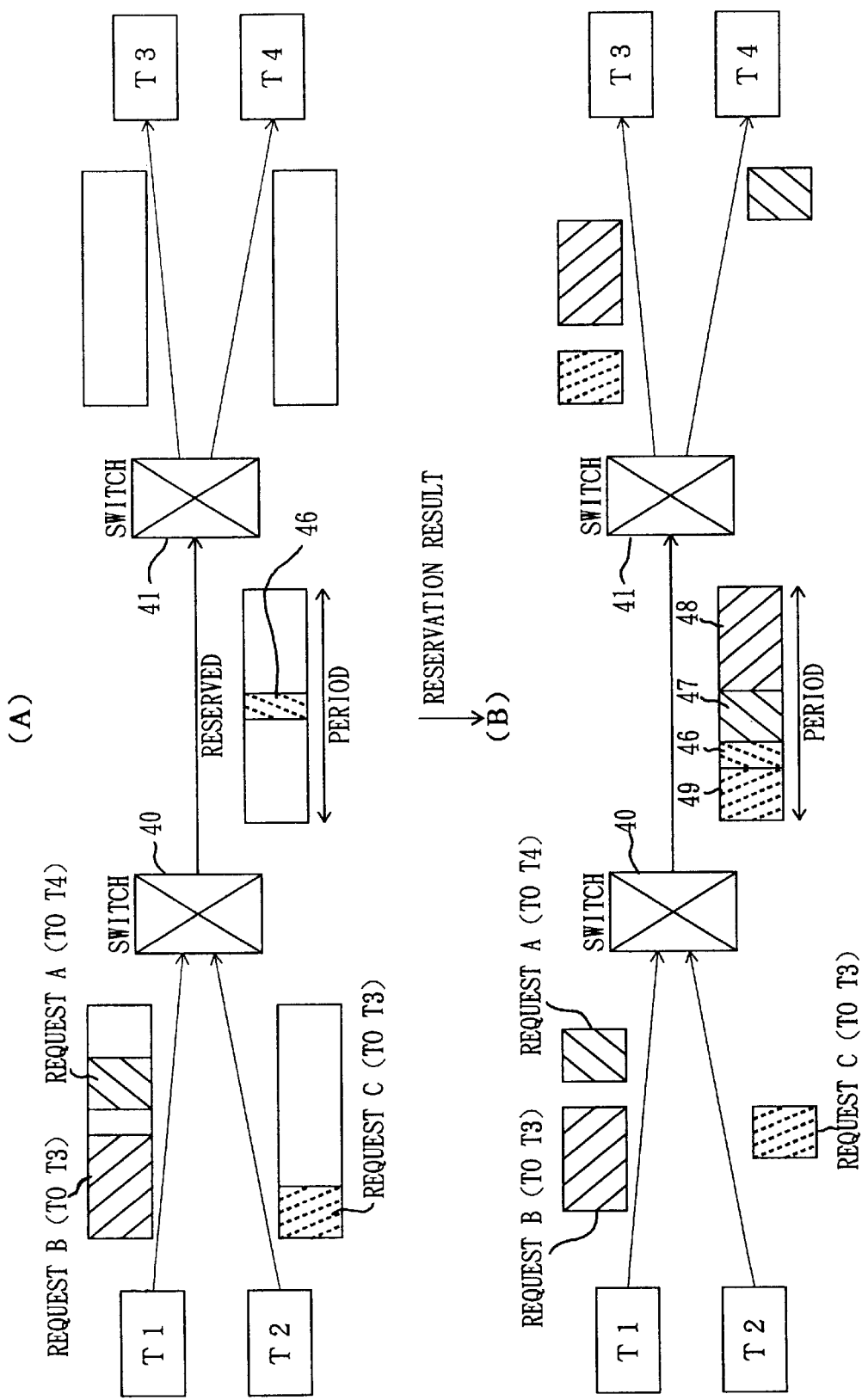
FIG. 18 is an explanatory diagram showing a communication reservation request by the rate to a period.

FIG. 18 is an explanatory diagram showing a communication reservation request in accordance with a rate to a period, and (A) shows a case in which the reserved rate indicated by reference numeral 46 exists between the switches 40 and 41 and the unused rate also exists sufficiently when the communication reservation request A is transmitted from the communication terminal T1 to the communication terminal T4, and the communication reservation request B is transmitted from the communication terminal T1 to the communication terminal T3, and the communication reservation request C is transmitted from the communication terminal T2 to the communication terminal T3 in accordance with rate designations, respectively.

Then, if the total of the rates of the respective communication reservation requests A, B and C is equal to or less than the unused rate, as shown in (B), reservation is received by the rate designation as indicated by reference numerals 47, 48 and 49 for the respective communication reservation requests A, B and C in one period. Then, the communication terminals T1 and T2 enable the burst transfer if the reservation rate is within one period. It should be noted that the reception of the communication reservation request when the reservation rate exceeds one period is refused.

Figure 19:
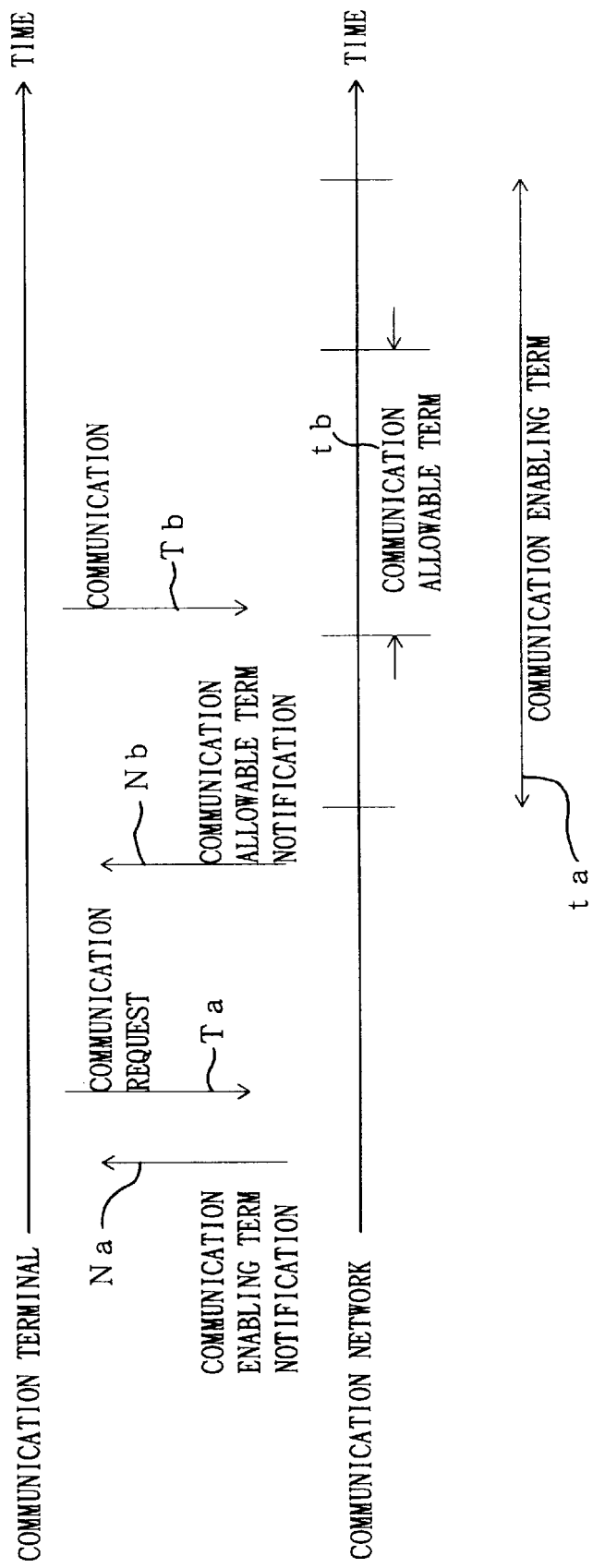
FIG. 19 is an explanatory diagram showing communication within a communication permission period.

FIG. 19 is an explanatory diagram showing communication within a communication permissible period, in which a notification Na of the communication enabling period ta is transmitted from the communication network to the communication terminal. As a result, when there exists a request for the burst transfer, the communication terminal transmits a communication request Ta representing a communication reservation request such as a communication start time, a communication time length, and a rate to the period ta within the communication enabling period ta to the communication network.

In the case where the communication network can receive the communication request Ta, it transmits the notification Nb of the transmission permissible period tb. The communication terminal starts the communication Tb of the burst transfer within the transmission permissible period tb. Hence, not only when the communication enabling period ta is fixed, but also when it is variable, the communication terminal can conduct the burst transfer on the basis of the reserved time length or rate within the transmission permissible period tb which is notified from the communication network.

Figure 20:
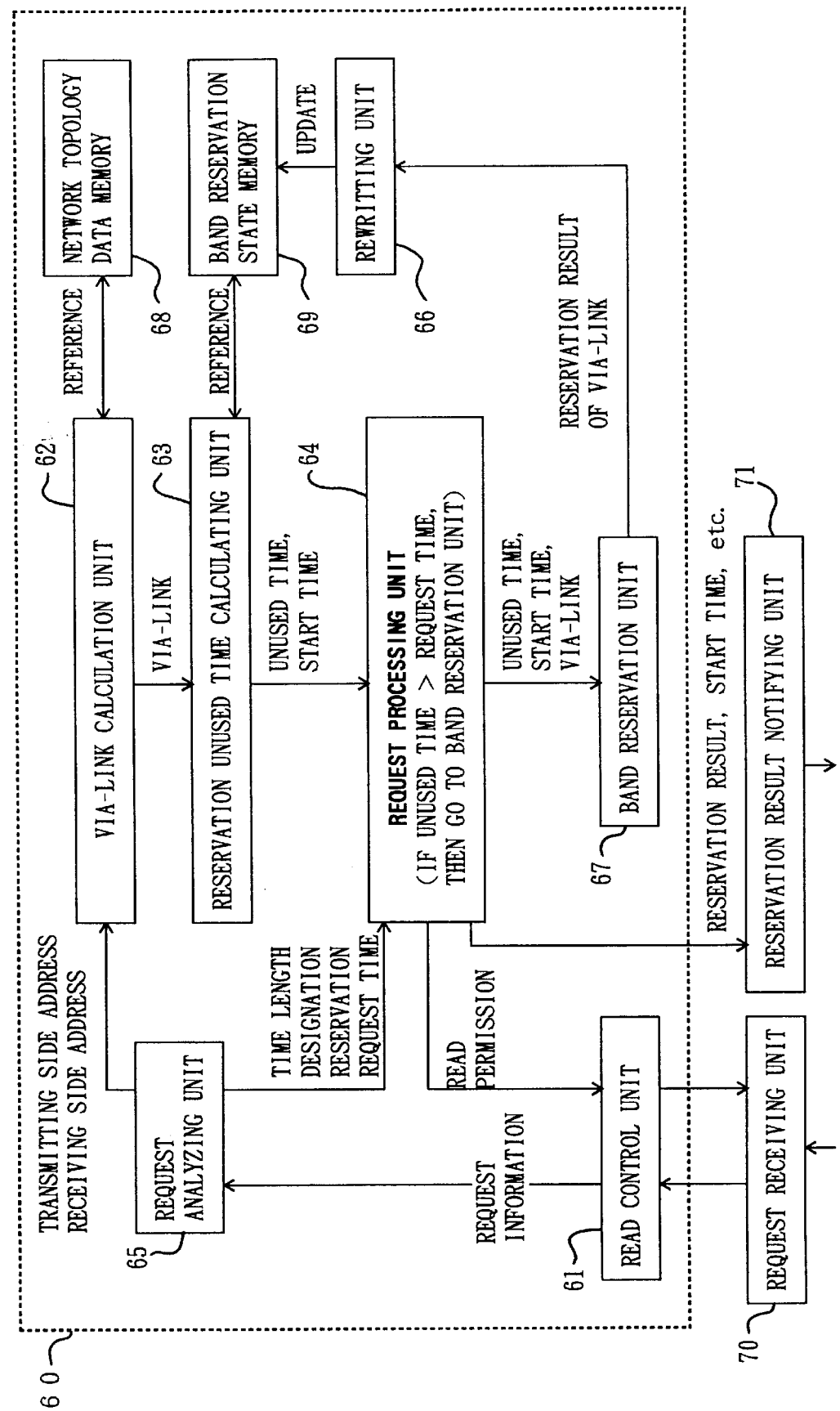
FIG. 20 is an explanatory diagram showing the function of a communication reservation request process of the network resource management unit.

FIG. 20 is an explanatory functional diagram showing a communication reservation request process of the network resource managing unit in which reference numeral 60 denotes a communication reservation request processing unit; 61, a read control unit; 62, a via-link calculating unit; 63, a reservation unused time calculating unit; 64, a request processing unit; 65, a request analyzing unit; 66, a rewriting unit; 67, a band reserving unit; 68, a network topology data memory; 69, a band reserving state memory; 70, a request receiving unit; and 71, a reservation result notifying unit.

The reservation receiving unit 70 corresponds to the request receiving unit 4 in FIG. 4, nd the request analyzing unit 65 corresponds to the request receiving unit 5 in FIG. 4. The request processing unit 64 and the band reserving unit 67 correspond to the band reserving unit 7 in FIG. 4, and the via-link calculating unit 62 and the network topology data memory 68 correspond to the path setting unit 6 in FIG. 4. Also, the network topology data memory 68 and the band reserving state memory 69 correspond to the network resource data section 8 in FIG. 4.

The read control unit 61 reads the communication reservation request for the burst transfer from the communication terminal received by the request receiving unit 70 in accordance with the read permission from the request processing unit 64, and then transfers it to the request analyzing unit 65. The request analyzing unit 65 analyzes request information, for example, in accordance with the communication reservation request format shown in FIG. 7, and transfers it to the link calculating unit 62 through the transmitting address and the receiving address. The request analyzing unit 65 then transfers the time length designation reservation request time to the request processing unit 64.

The via-link calculating unit 62 obtains the via-link between the transmitting side communication terminal and the receiving side communication terminal on the basis of the transmitting side address and receiving side address from the request analyzing unit 65 with reference to the network topology data of the network topology data memory 68, and then transfers the via-link to the reservation unused time calculating unit 63. The reservation unused time calculating unit 63 obtains the unused time and the communication start time with reference to the reservation state corresponding to the via-link stored in the band reserving state memory 69, to transfer it to the request processing unit 64.

The request processing unit 64 compares the unused time with the request time, and if the unused time is longer, the reservation information containing the remaining unused time, the start time and the via-link to the band reserving unit 67, and then transfers the reservation receiving information including the reservation result and the start time to the communication terminal through the reservation result notifying unit 71. Also, the band reserving unit 67 controls the rewriting unit 66 to update the reservation state corresponding to the via-link of the band reserving state memory 69. Hence, the band reserving state memory 69 is updated every time it receives the communication reservation request for the burst transfer.

Figure 21:
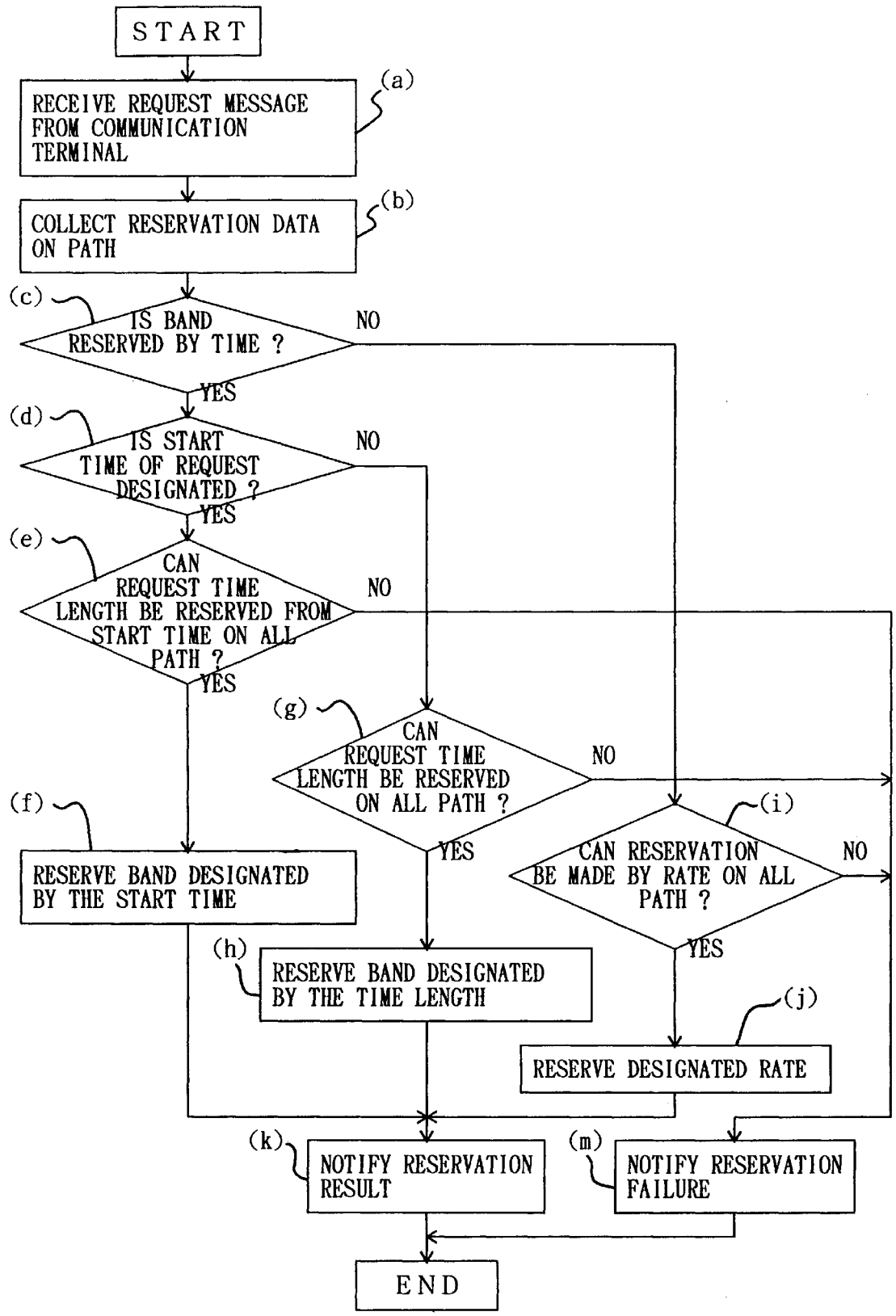
FIG. 21 is a flowchart showing an embodiment of the present invention.

FIG. 21 is a flowchart showing the embodiment of the present invention, and in the communication network or its network resource managing unit, (a) request message (communication reservation request) of the burst transfer from the communication terminal is received, (b) reservation data on a path which is obtained on the basis of the transmitting side address and the receiving side address is collected, and (c) it is judged whether or not the communication reservation request from the communication terminal reserves a band on the basis of a time (a communication start time, a communication time length) or reserves the band on the basis of the rate within a period.

In the case where the band is reserved by time, (d) it is judged whether or not the request designates the start time, and in the case where the start time is designated, (e) it is judged whether or not the reservation of the request time length can be made from the start time on all the paths. In the case where the reservation can be made by the existence of the unused time band, (f) the time designation band is reserved, and (k) its reservation result is notified to the request transmission communication terminal (transmitting side communication terminal).

Also, in step (c), in the case where the band is not reserved by time but the band is reserved at a rate within a period, (i) it is judged whether or not the reservation can be made as a rate within a period on all the paths. In the case where the rate within the period is sufficient, since it can be reserved, (j) a rate designation reservation is set, and (k) the reservation result is notified to the request transmission communication terminal. Also, in the case where the rate within the period is insufficient, (m) a reservation failure notification is notified to the request transmission communication terminal.

Further, in step (d), in the case where the start time is not designated, (g) it is judged whether or not the reservation of the request time length can be made on all the paths, or the like. In the case where the reservation can be made, (h) the time length designation band is reserved, and (k) its reservation result is notified to the request transmission communication terminal. Also, in the case where the reservation cannot be made, (m) a reservation failure notification is notified to the request transmission communication terminal. Also, in step (e), in the case where the reservation cannot be made, because of a reservation failure, (m) its reservation failure notification is notified to the request transmission communication terminal.

Figure 22:
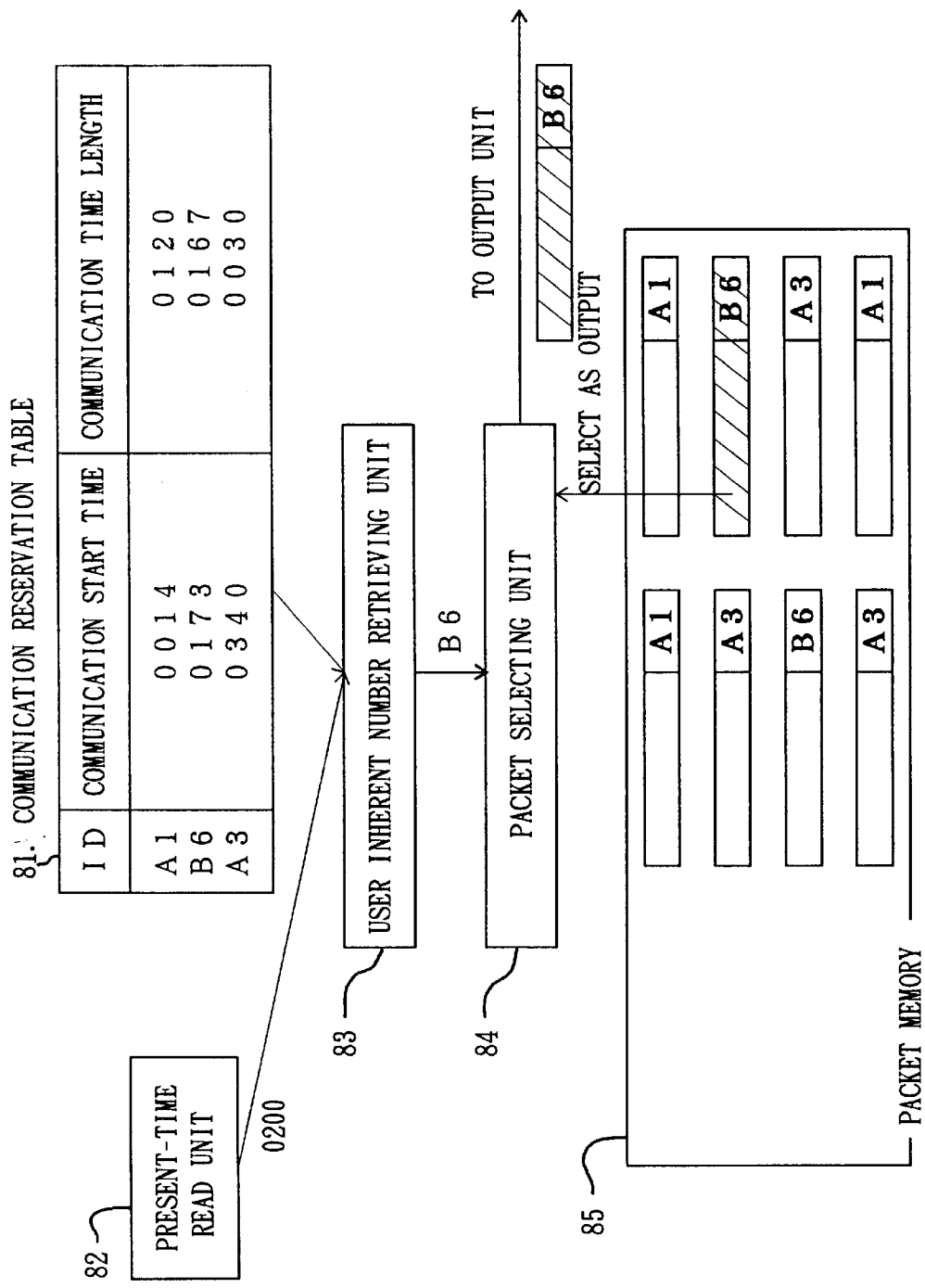
FIG. 22 is an explanatory diagram showing transfer control in a start time designation reservation.

FIG. 22 is an explanatory diagram showing transfer control in a start time designation reservation, which shows the main portion of the function of the ATM switch 22 in FIG. 2, or the main portion of the function of the ATM switch in FIG. 3. In the figure, reference numeral 81 denotes a communication reservation table; 82, a present-time reading unit; 83, a user inherent number retrieving unit; 84, a packet selecting unit; and 85, a packet memory. FIG. 22 shows a case of the label multiplex communication using packets, and the packet memory 85 is a buffer for storing the packet temporarily in a communication network.

Also, in the case where it is applied to the ATM system, making the ATM switch shown in FIG. 3 in association with the respective components, the output buffer 53 corresponds to the packet memory 85, the cell selecting unit 54 corresponds to the packet selecting unit 84, the present-time obtaining unit 55 corresponds to the present-time reading unit 82, and the reservation data section 56 corresponds to the communication reservation table 81, respectively. Also, in the case where it is applied to the time-division multiplex system, the packet memory 85 corresponds to the buffer for storing the frame data temporarily, and the packet selecting unit 84 corresponds to the selection function of the frame data to which time slots are allocated.

Also, the communication reservation table 81 stores the communication start time "0014, 0173, 0340, . . . " and the communication time length "0120, 0167, 0030, . . . " in correspondence with the ID number "A1, B6, A3, . . . ", in accordance with the communication reservation request from the communication terminal. It should be noted that in case of the label multiplex communication using the ATM cell, the virtual path identifier VPI and the virtual channel identifier VCI of the header of the ATM cell correspond to the above-mentioned ID number.

A plurality of packets to which the ID number is added are stored in the packet memory 85, and the present-time reading unit 82 reads the present time "0200" and then transfers it to the user inherent number retrieving unit 83. Then, the user inherent number retrieving unit 83 retrieves whether or not a time band having the present time "0200" exists in the time bands represented by the communication start time and the communication time length which are registered in the communication reservation table 81.

In this case, since ID=A1 of the communication reservation table 81 is the communication start time "0014" and the communication time length "0120", the time band becomes "0134", thus not including the present time "0200". Since the communication start time of ID=B6 is "0173" and the communication time length is "0167", the time band "0340" includes the present time "0200", whereby ID=B6 is retrieved and outputted and transferred to the packet selecting unit 84.

The packet selecting unit 84 selects and takes out the packet of ID=B6 from the packet memory 6 on the basis of ID=B6, and transfers the packet to an output unit. Then, the packet of the next "ID=B6" can be sequentially taken out from the packet memory 85 and then transferred within a range where it does not exceed the communication time length "0167" from the communication start time "0137". Hence, the burst transfer can be conducted in accordance with the communication reservation request containing the communication start time and the time length. In this case, if the packet memory 85 is a memory of the FIFO form in correspondence with the ID number, it can be sequentially taken out and transferred in correspondence with the ID number. Alternatively, it can discriminate the packet number and sequentially take out it.

Figure 23:
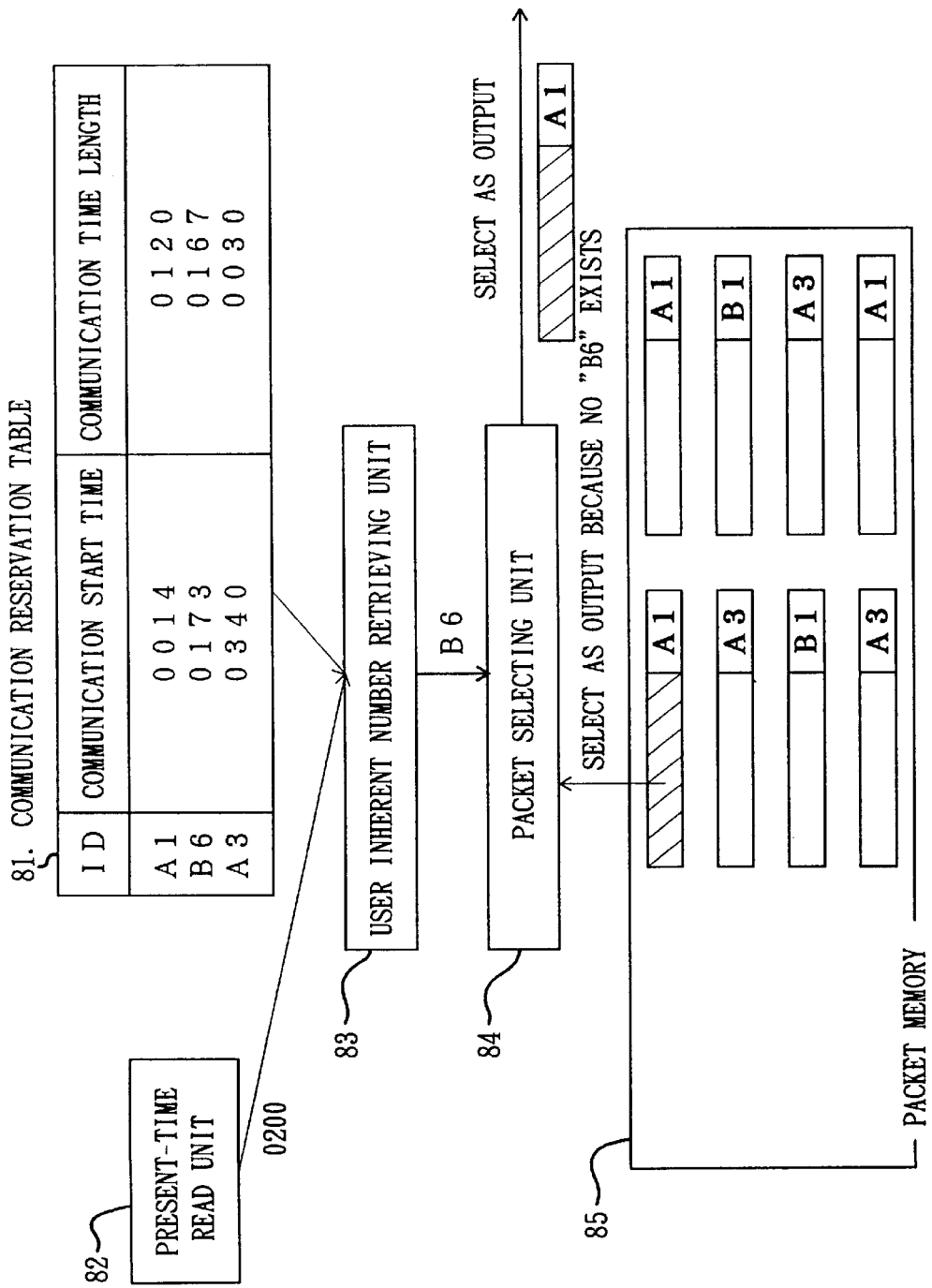
FIG. 23 is an explanatory diagram showing a case where no reservation packet exists at the communication start time.

FIG. 23 is an explanatory diagram showing a process in the case where no reservation packet exists at a communication start time, and shows a case in which, as in the case of FIG. 22, when the present-time reading unit 82 reads the present time "0200" with the contents of the communication reservation table 81, there exists no packet of ID=B6 in the packet memory 85, and nothing can be taken out from the packet memory 85. In other words, only the packets in accordance with the communication start time and the communication time length registered in the communication reservation table 81 are taken out from the packet memory 85 and then transferred.

However, in FIG. 23, in the case where the receiving-side communication terminal or the switch of the communication network provides a buffer having a sufficient capacity which is capable of receiving and storing the packet, an arbitrary packet is selected from the packet memory 85 and taken out so as to be transferred, as shown as the packet of ID=A1. As a result, in the case where an unused time occurs in the reserved time band, since another packet can be transferred to the unused time, thereby being capable of effectively using the communication network.

Figure 24:
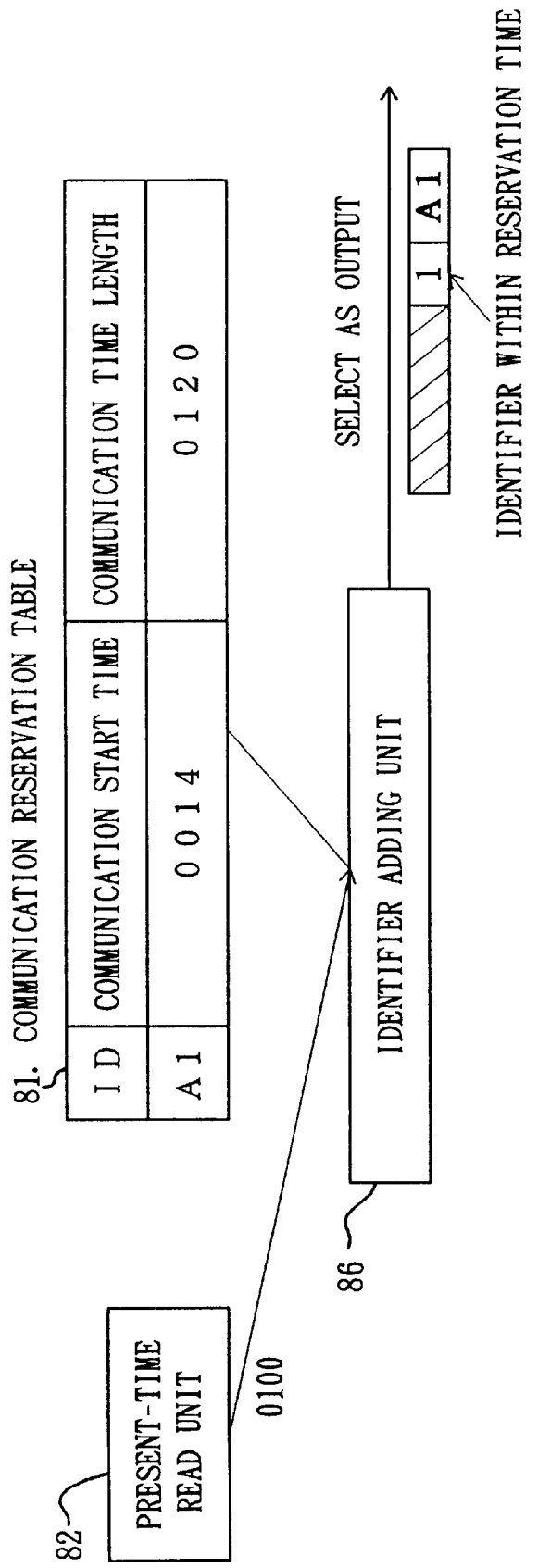
FIG. 24 is an explanatory diagram showing identification data within a reservation time.

FIG. 24 is an explanatory diagram showing an identifier within a reserved time. ID=A1, the communication start time "0014", and the communication time length "0120" are registered in the communication reservation table 81, and when the present-time reading unit 82 reads the present time "0100", since it is within the time band of the communication time length from the communication start time, the packet of ID=A1 is taken out from the packet memory (not shown) and then transferred. In this case, an identifier within the reservation time is added thereto by an identifier adding unit 86 and then transferred.

Since the switch (exchanger) of the communication network in the case of transferring through a plurality of links by the identifier can judge the packet by the reservation time, it processes in priority. The identifier can be added to the header of the packet. Also, in case of the ATM cell, using cell loss priority CLP of the header, for example, CLP="0" is set as an identifier within the reserved time, and the ATM cell is processed in priority. In the ATM cell which is not reserved or in the ATM cell when a communication out of the reserved time band occurs, CLP=1 can be set. Also, in case of time-division multiplex made by time slot allocation or the like, the identifier within the reserved time can be added by a leading time slot continuously allocated or the control time slot, and then transferred.

FIG. 25 is an explanatory diagram showing reservation on a plurality of link paths, in which switching units 93 and 94 exist along a path between the transmitting side communication terminal 91 and the receiving side communication terminal 92. In a link between the transmitting side communication terminal 91 and the switching unit 93 and in a link between the switching units 93 and 94, as shown on the right side in the figure, the same time band within the period can be reserved. However, because another reservation exists, there is shown a case in which the same time band can be reserved between the transmitting side communication terminal 91 and the receiving side communication terminal 92. In this situation, since an unused time band exists in a time band delayed. Hence, reservation can be made to the unused time band.

In this situation, as described above, it is temporarily stored in the output buffer provided in the switching unit 94 (refer to reference numeral 53 of FIG. 3) or in buffers such as the packet memory (refer to reference numeral 85 of in FIG. 22) or the like, and is then read in the reserved time band so as to be transferred to the receiving side communication terminal 92. Also, in the time-division multiplex communication, the time slots are allocated to time slots represented as a request reservation, and the buffer in the switching unit 94 is used, thereby being capable of conducting the burst transfer using the continuous time slots from the transmitting side communication terminal 91 to the receiving side communication terminal 92.

FIG. 26 shows a case of investigating the reservation of each link in a path between the transmitting side communication terminal 91 and the receiving side communication terminal 92 and making a reservation. Another reservation exists in the intermediate time band of the period between the transmitting side communication terminal 91 and the switching unit 93 and between the switching units 93 and 94, and unused time bands exist before and after the above time band. Also, another reservation exists in the front half of the period between the switching unit 94 and the receiving side communication terminal 92, and an unused time band exists in the rear half thereof. In this case, even with the time band slow within the period, if it is discriminated that the reservation can be made on the same time band in all the links, then the time band is reserved for all the links. In this case, the use amount of the buffer is reduced, and a delay time within the communication network can be reduced.

Figure 27:
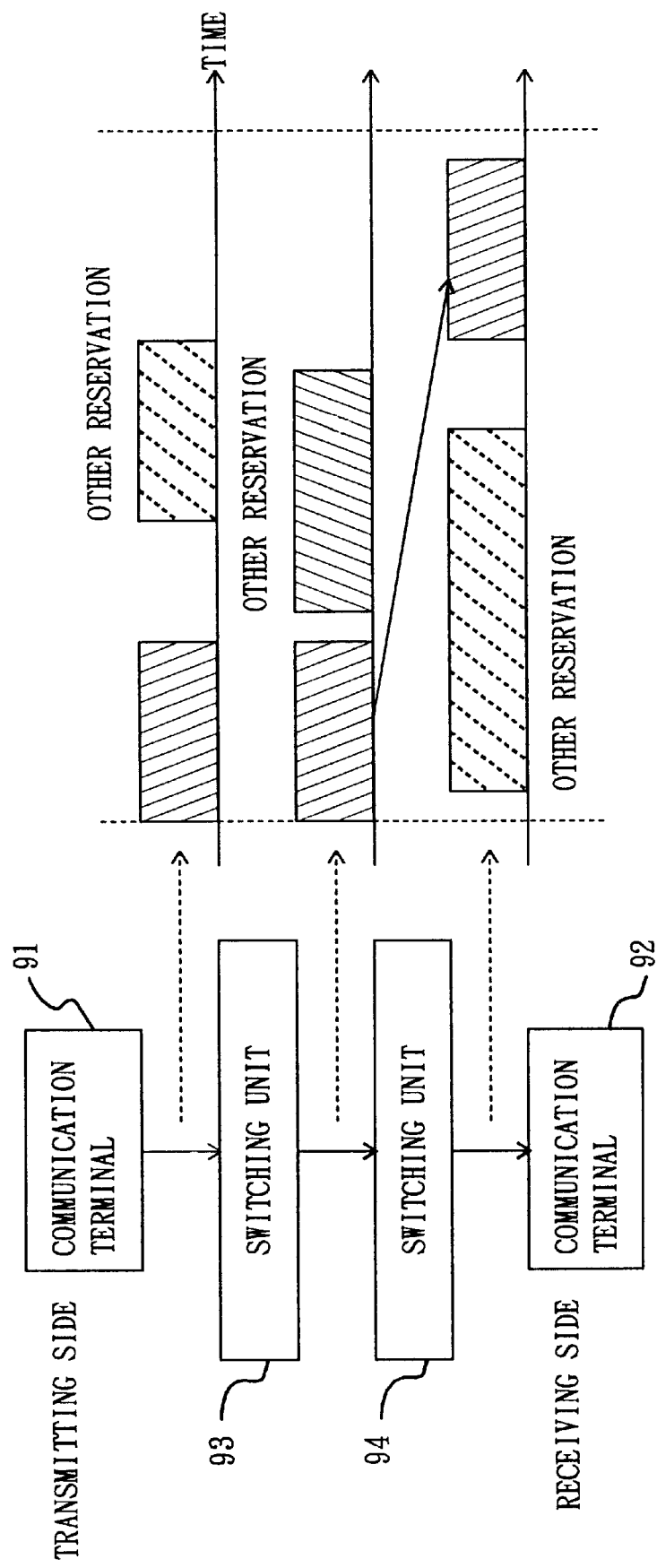
FIG. 27 is an explanatory diagram showing the sequential reservation of the plural links.

FIG. 27 is an explanatory diagram showing the sequential reservation of a plurality of links. As in the cases shown in FIGS. 25 and 26, there is a case in which the switching units 93 and 94 exist in the path between the transmitting side communication terminal 91 and the receiving side communication terminal 92. In this case, first, a reservable unused time band within the period is investigated for the links between the transmitting side communication terminal 91 and the switching unit 93, and an early time band in the unused time band is reserved. In the case where the reservation can be made, the a reservable unused time band within the period is investigated for the links between the transmitting side communication terminal 93 and the switching unit 94, and a time band which is identical with or later than the previously reserved time band among the unused time band. If this reservation can be made, a reservable unused time band within the period is investigated for the links between the next switching unit 94 and the receiving side communication terminal 92, thus making reservation of a time band identical with or later than the previously reserved time band among the ensued time and bands.

Through the above sequential reservation, as shown in the respective links in FIG. 27, because of the existence of another reservation, the same time band is reserved between the transmitting side communication terminal 91 and the switching unit 93 and between the switching units 93 and 94, and a late time band within the period can be reserved between the switching unit 94 and the receiving side communication terminal 92.

In this case, the reservation result is similar to the case shown in FIG. 25, the reservation process is sequentially conducted toward the communication terminal of the receiving side so that the time band for each link on the path is identical with or later than the reservable time band for the previous link. The communication reservation request of burst transfer from the transmitting side communication terminal 91 is sequentially transferred along the path within the communication path, and the previous reservation information is added thereto. As a result, when the final link reservation can be made, the communication reservation request is accepted, and the burst communication is reserved. Hence, after collecting the reservation state of all the links on the path, in comparison with a case shown in FIG. 26, there is reduced the possibility of reserving the links at the same time band. However, the processing necessary for the reservation is distributed, thereby being capable of reducing a processing time.

Figure 28:
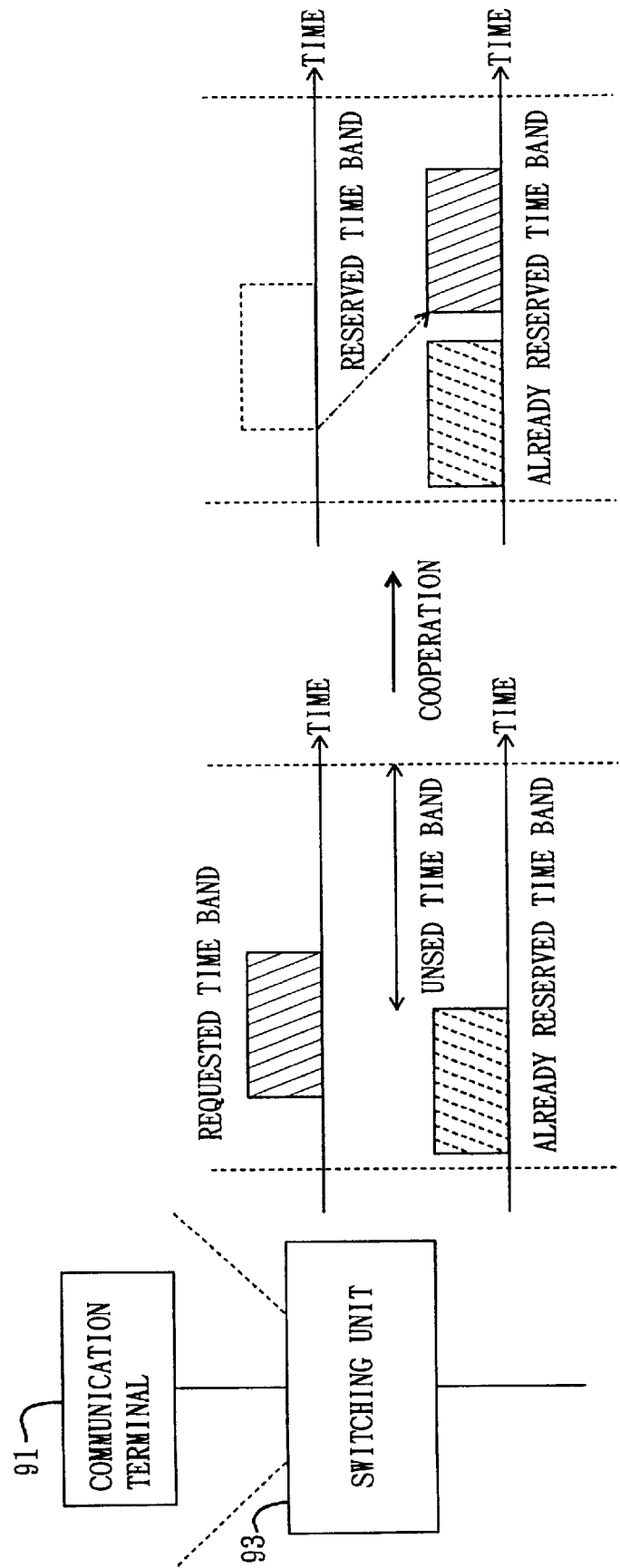
FIG. 28 is an explanatory diagram showing a request time band change.

FIG. 28 is an explanatory diagram showing the request time band change. A communication reserving request for the burst transfer including the communication start time and the communication time length from the transmitting side communication terminal 91 is transmitted through the communication terminal, and in the case where the request time band overlaps with the reserved transfer as shown in the right side. In this case, the switching unit 93 notifies the communication terminal 91 of a reservation failure. Then, the communication terminal 91 changes the request time band to transmit the communication reservation request again. Still in the case where the request time band overlaps with the reserved time band, the switching unit 93 transmits the communication terminal 91 of the reservation failure again. In other words, there is the possibility that the communication reservation is frequently requested.

For that reason, the unused time band with in the period is notified together with the notification of the reservation failure. In the case where the communication terminal 91 judges that the burst transfer is enabled even though the unused time band is a late time band within the period, the communication reservation request is conducted again with the unused time band as the request time band, thereby being capable of delaying the initial request time band (indicated by dotted line) as shown at the right side to provide a reservation time band.

Such an unused time band is updated and stored together with the reserved communication start time for the via-link, the communication time length, and so on in the band reserving state memory 69 in FIG. 20. Therefore, the unused time can be read and added to the above-mentioned reservation failure notification before being transmitted. Also, a result of reading the contents of the management table 30 in FIG. 15 from the table retrieving unit 37 is processed to obtain the unused time band, and the unused time band can be added to the reservation failure notification before being transmitted.

Figure 29:
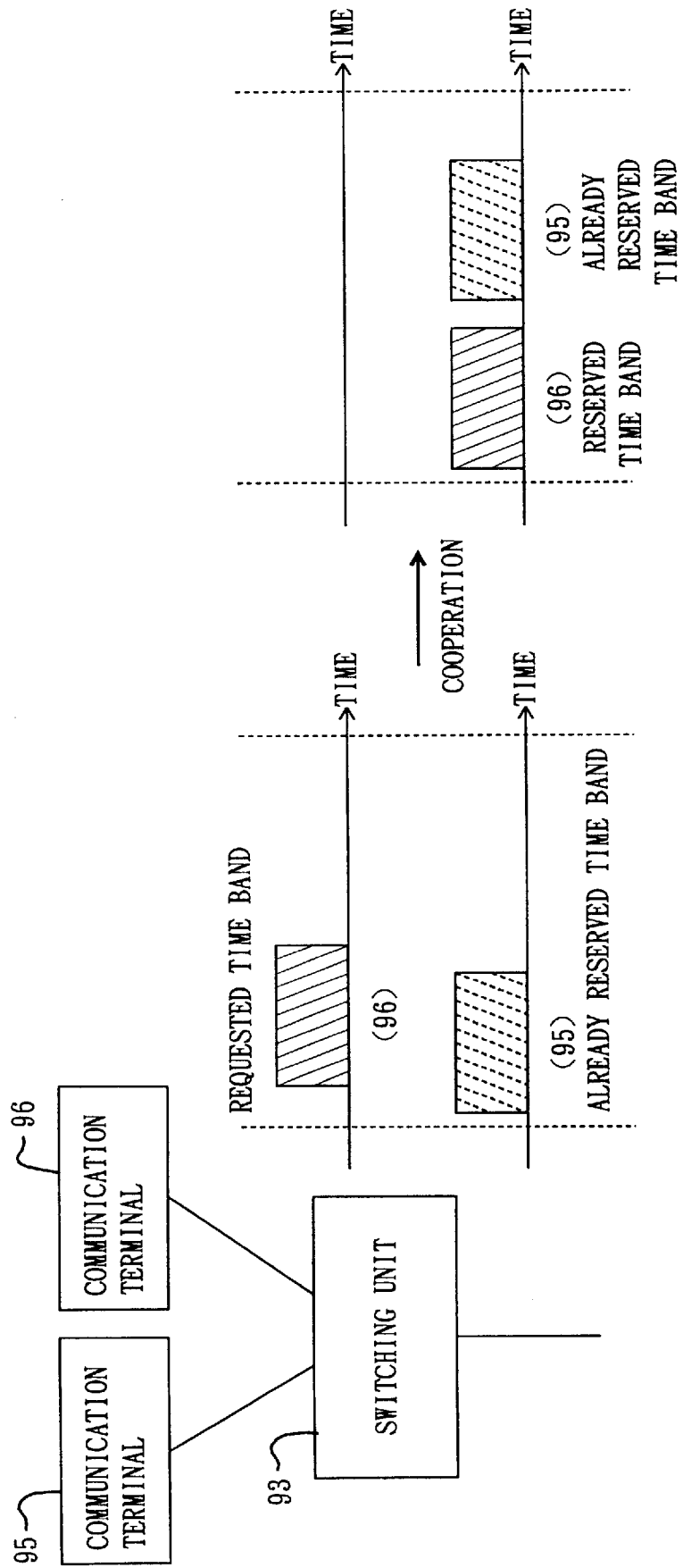
FIG. 29 is an explanatory diagram showing a reserved time band change.

FIG. 29 is an explanatory diagram showing a reserved time band change. One of the communication terminals 95 and 96 received in the switching unit 93, for example, the communication terminal 95 conducts a communication reservation request. As shown in the right side (95), if the other communication terminal 96 conducts the communication reservation request at the request time band indicated by (96) when there exists the reserved time band, in the above-mentioned embodiment, the reservation fails. However, the switching unit 93 inquires of the communication terminal 95 whether or not the reserved time band can be changed, in order to change the reserved time band in accordance with the re-request from the communication terminal 96, or the communication terminal 96 high in priority.

In the case where the reserved time band can be changed, as shown in the right side as after-cooperation, the reserved time band is changed into the rear-half unused time band, and the request time band from the communication terminal 96 is set to the front half of the period. Also, in the case where the reserved time band cannot be changed, as shown in FIG. 28, the unused time band is notified, and the request time band is changed, or a reserving process is conducted in the following period.

FIG. 30 is an explanatory diagram showing a time required for transfer, and as shown in (B), in the structure where communication terminals TA to TE are connected to a common transmission path through an ATM switch, the respective communication terminals TA to TE generate data of the same amount simultaneously and transfer the data through the common transmission path. In this case, in the band common type transfer of (A), if the bands allocated to the respective communication terminals TA to TE are made equal to each other, the respective communication terminals TA to TE transfer the data at a speed ⅕ of the highest speed. Hence, when the respective communication terminals TA to TE start to transfer the date simultaneously, the data transfer are completed simultaneously.

Also, in the burst transfer (A) in FIG. 30, to which the present invention is applied, there is shown a case where the time bands are reserved in the order of the communication terminals TA to TE. Until the transfer of the communication terminal that reserves a preceding time band is completed, the transfer of the communication terminal that reserves a succeeding time band waits to start. However, the data transfer can be made at the highest speed in the respective reserved time bands. In this case, the use rate as the communication network is identical with that of the band common type transfer and the burst transfer, however, a time required for transfer containing a wait time is largely different. In other words, compared with the band common type transfer, the burst transfer has a time required for transfer containing a wait time, such that the communication terminal TA is ⅕, and the communication terminal TB is ⅖. Also, the longest-waiting communication terminal TE is equal to the case of the band common transfer.

Moreover, in the case where the burst data is different in amount, the wait time of the burst transfer small in the amount of transfer data is increased by the burst transfer large in the amount of transfer data, with the result that a time required for transfer may be increased more in case of the band common type transfer. Therefore, the amount of transfer data in accordance with the burst transfer request from the respective communication terminals TA to TE is compared with each other, and the burst transfer small in the amount of transfer data in a period where a communication reservation is requested is reserved in an early time band within the period, thereby being capable of reducing the wait time as a whole.

Furthermore, in the above-mentioned respective embodiments, a period during which a communication reservation request is received is set to one period. However, the communication reservation request may be received in a plurality of periods. In this case, there may be provided means for registering request band information such as the communication start time and the communication time length or a rate to the period, respectively, in correspondence with the period and the destination of the communication terminal. Similarly, in the case where a plurality of communication networks are connected to each other, and the burst transfer is conducted between the transmitting side communication terminal and the receiving side communication terminal which are received in different communication networks, respectively, the communication reservation request is received under a decentralized control, thereby being capable of conducting the burst transfer.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A burst transfer system comprising:

request receiving means for receiving a communication reservation request including at least a destination address for a burst transfer and a use band information representing a rate of a time occupied by the burst transfer to a given period;

communication request analyzing means for analyzing a communication reservation request received by said request receiving means to discriminate the destination address and the use band information;

path setting means for discriminating paths through which a communication terminal and a destination of said destination address are connectable to each other on the basis of the destination address which is discriminated by said communication request analyzing means;

band reserving means for discriminating a path, among the paths which have been discriminated by said path setting means, which can make the burst transfer during a time length from a starting time, for reserving said path, and wherein said band reserving means transmits information representing that the communication reservation request has been received and the time of starting of the use of said path to said communication terminal, and reserves a terminal resource within said communication terminal to transmit burst data at said starting time of using said path;

a communication reservation table for storing data discrimination information for discriminating data which is burst transfer starting time, and length of time to be used for the burst transfer of said data;

a present-time reading unit for generating a present time;

an output buffer for storing the data to be burst-transferred; and selecting means, wherein when the present time generated by said present-time reading unit represents a starting time of burst transfer as stored in said communication reservation table, said selecting means reads said data discrimination information from said communication reservation table, and reads data discriminated by the data discrimination information from said output buffer to transmit said data to said destination.

2. A burst transfer system comprising:

request receiving means for receiving a communication reservation request including at least a destination address for a burst transfer and a use band information representing a rate of a time occupied by the burst transfer to a given period;

communication request analyzing means for analyzing a communication reservation request received by said request receiving means to discriminate the destination address and the use band information;

path setting means for discriminating paths through which a communication terminal and a destination of said destination address are connectable to each other on the basis of the destination address which is discriminated by said communication request analyzing means;

band reserving means for discriminating a path, among the paths which have been discriminated by said path setting means, which can make the burst transfer during a time length from a starting time, said band reserving means reserving said path, and transmitting information representing that the communication reservation request has been received and the time of starting of the use of said path to said communication terminal, and reserving a terminal resource within said communication terminal to transmit burst data at said starting time of using said path;

a communication reservation table for storing data discrimination information for discriminating data which is burst transfer starting time, and length of time to be used for the burst transfer of said data;

a present-time reading unit for generating a present time;

an output buffer for storing the data to be burst-transferred; and selecting means, wherein when the present time generated by said present-time reading unit represents a time band represented by a communication starting time and a length of communication time of burst transfer as stored in said communication reservation table, said selecting means reads said data discrimination information from said communication reservation table, and reads arbitrary data from said output buffer if no data which is discriminated by the data discrimination information exists in said output buffer, and transmits said arbitrary data to said destination.

3. A burst transfer system comprising:

request receiving means for receiving a communication reservation request including at least a destination address for a burst transfer and a use band information representing a rate of a time occupied by the burst transfer to a given period;

communication request analyzing means for analyzing a communication reservation request received by said request receiving means to discriminate the destination address and the use band information;

path setting means for discriminating paths through which a communication terminal and a destination of said destination address are connectable to each other on the basis of the destination address which is discriminated by said communication request analyzing means; and band reserving means, wherein assuming that said band reserving means collects a reservation state of each path, said band reserving means judges, when receiving the communication reservation request for the burst transfer from said communication terminal, whether or not a reservation can be made between said communication terminal and said destination in a time band represented by a starting time and a communication time length of said burst transfer by referring to the reservation states collected by said band reserving means; and wherein if the reservation can be made between the path of said communication terminal and the path of said destination, said time band represented by said starting time and said communication time length is reserved, and if no reservation can be made between the path of said communication terminal and the path of said destination, said band reserving means judges whether or not a time band later than the time band represented by said starting time and said communication time length can be reserved, and if the later time band can be reserved, the time band later than said time band is reserved, whereas if the later time band cannot be reserved, said band reserving means discriminates an unused time band in each path, to set a time band which is identical with or sequentially made later than the reservation time band of the path of said communication terminal to each path in a direction of a communication terminal of a receiving side, and transmits information representing that the communication reservation request has been received and the time of starting of the use of said reserved path to said communication terminal, and reserves a terminal resource within said communication terminal to transmit burst data at said starting time of using said path.

4. A burst transfer system comprising:

request receiving means for receiving a communication reservation request including at least a destination address for a burst transfer and a use band information representing a rate of a time occupied by the burst transfer to a given period;

communication request analyzing means for analyzing a communication reservation request received by said request receiving means to discriminate the destination address and the use band information;

path setting means for discriminating paths through which a communication terminal and a destination of said destination address are connectable to each other on the basis of the destination address which is discriminated by said communication request analyzing means; and band reserving means, wherein assuming that said band reserving means collects a reservation state of each path, said band reserving means judges, when receiving the communication reservation request of the burst transfer from said communication terminal, whether or not a reservation can be made between said communication terminal and said destination in the time band represented by a starting time and a communication time length by referring to a reservation state of a path of said communication terminal, and wherein if the reservation can be made on the path of said communication terminal, said band reserving means reserves a time band which is identical with or sequentially made later than said reservable time band, to sequentially make a reservation up to the path of a communication terminal of a receiving side, and transmits information representing that the communication reservation request has been received and the time of starting of the use of said reserved path to said communication terminal, and reserves a terminal resource within said communication terminal to transmit burst data at said starting time of using said path.

5. A burst transfer system comprising:

request receiving means for receiving a communication reservation request including at least a destination address for a burst transfer and a use band information representing a rate of a time occupied by the burst transfer to a given period;

communication request analyzing means for analyzing a communication reservation request received by said request receiving means to discriminate the destination address and the use band information;

path setting means for discriminating paths through which a communication terminal and a destination of said destination address are connectable to each other on the basis of the destination address which is discriminated by said communication request analyzing means; and band reserving means, wherein assuming that said band reserving means collects a reservation state of each path, said band reserving means judges, when receiving the communication reservation request for the burst transfer from said communication terminal, a reservation state of a path to said communication terminal, and wherein if a time band requested by said communication reserving request has been already reserved, said band reserving means transmits a time band which becomes an unused time band to said communication terminal.

6. A burst transfer system comprising:

request receiving means for receiving a communication reservation request including at least a destination address for a burst transfer and a use band information representing a rate of a time occupied by the burst transfer to a given period;

communication request analyzing means for analyzing a communication reservation request received by said request receiving means to discriminate the destination address and the use band information;

path setting means for discriminating paths through which a communication terminal and a destination of said destination address are connectable to each other on the basis of the destination address which is discriminated by said communication request analyzing means; and band reserving means, wherein assuming that said band reserving means collects a reservation state of each path, said band reserving means judges, when receiving the communication reservation request for the burst transfer from said communication terminal, a reservation state of a path to said communication terminal, and wherein if a time band requested by said communication reserving request has been already reserved, said band reserving means inquires to the communication terminal that has reserved said time band whether or not a change in the reserved time band can be made, and if the change in said time band can be made, said band reserving means changes said time band to make a reservation for the time band which is requested by the communication reservation request from said communication terminal.

* * * * *